United States Patent
Farrell

(10) Patent No.: US 11,635,883 B2
(45) Date of Patent: Apr. 25, 2023

(54) INDICATION OF CONTENT LINKED TO TEXT

(71) Applicant: Micah Development LLC, Boston, MA (US)

(72) Inventor: Richard Farrell, San Jose, CA (US)

(73) Assignee: Micah Development LLC, San Jose, CA (US)

( * ) Notice: Subject to any disclaimer, the term of this patent is extended or adjusted under 35 U.S.C. 154(b) by 0 days.

(21) Appl. No.: 17/179,083

(22) Filed: Feb. 18, 2021

(65) Prior Publication Data

US 2021/0255759 A1 Aug. 19, 2021

Related U.S. Application Data

(60) Provisional application No. 62/978,127, filed on Feb. 18, 2020.

(51) Int. Cl.
*G06F 3/04842* (2022.01)
*G06F 16/22* (2019.01)
(Continued)

(52) U.S. Cl.
CPC ........ *G06F 3/04842* (2013.01); *G06F 3/0481* (2013.01); *G06F 9/451* (2018.02); *G06F 16/22* (2019.01)

(58) Field of Classification Search
CPC .... G06F 3/04842; G06F 3/0481; G06F 9/451; G06F 16/22; G06F 3/167; G06F 16/784; G06F 16/483; G06F 3/0482
See application file for complete search history.

(56) References Cited

U.S. PATENT DOCUMENTS 6,714,215 B1 3/2004 Flora et al.
6,956,593 B1 10/2005 Gupta et al.
(Continued)

OTHER PUBLICATIONS

"Pick a Great Reading Plan from YouVersion", [Online], Retrieved from the Internet: <URL: https://blog.youversion.com/2012/12/pick-a-great-reading-plan-from-youversion/>, (Accessed online Feb. 15, 2021), 2 pages.

(Continued)

*Primary Examiner* — Tuyetlien T Tran
(74) *Attorney, Agent, or Firm* — Schwegman Lundberg & Woessner, P.A.

(57) ABSTRACT

A computing apparatus includes a processor and a memory storing instructions that, when executed by the processor, configure the apparatus to cause presentation of a graphical user interface (GUI), the GUI depicting primary content, cause presentation of an indicator corresponding to a portion of the primary content, the indicator indicating availability of secondary content, detect user selection of the indicator, responsive to the detection of the user selection of the indicator, cause presentation of an index of secondary content associated with the portion of the primary content, the index of secondary content includes secondary content identifiers that are user selectable, detect user selection of a selected secondary content identifier from the index of content, responsive to the detection of the user selection of the selected secondary content identifier, retrieve selected secondary content associated with the selected secondary content identifier, and cause presentation of the selected secondary content.

16 Claims, 17 Drawing Sheets

(51) Int. Cl.
    *G06F 9/451*        (2018.01)
    *G06F 3/0481*     (2022.01)

(56) References Cited

U.S. PATENT DOCUMENTS

| | | | |
|---|---|---|---|
| 7,360,166 B1 | 4/2008 | Krzanowski | |
| 8,161,411 B2 | 4/2012 | Robbin et al. | |
| 8,477,109 B1* | 7/2013 | Freed | G06F 3/04842 |
| | | | 345/173 |
| 8,542,205 B1* | 9/2013 | Keller | G06F 16/332 |
| | | | 345/173 |
| 8,887,044 B1 | 11/2014 | Goodspeed et al. | |
| 9,223,475 B1 | 12/2015 | Kim | |
| 9,268,733 B1* | 2/2016 | Rachabathuni | G06F 3/0483 |
| 9,350,950 B2 | 5/2016 | Carden | |
| 9,594,489 B2* | 3/2017 | Niranjani | G06F 3/04842 |
| 9,891,794 B2 | 2/2018 | Senderek et al. | |
| 10,063,931 B2 | 8/2018 | Bi et al. | |
| 10,552,514 B1* | 2/2020 | Marcum | G06F 40/103 |
| 2006/0242596 A1 | 10/2006 | Armstrong | |
| 2010/0042660 A1* | 2/2010 | Rinearson | G06F 16/907 |
| | | | 707/E17.116 |
| 2010/0241663 A1 | 9/2010 | Huang et al. | |
| 2011/0261030 A1* | 10/2011 | Bullock | G06F 3/0488 |
| | | | 345/204 |
| 2011/0302152 A1* | 12/2011 | Boyd | H04L 67/025 |
| | | | 707/E17.014 |
| 2012/0212438 A1* | 8/2012 | Vaisanen | G06F 3/04886 |
| | | | 345/173 |
| 2012/0233539 A1* | 9/2012 | Reed | G06F 3/04842 |
| | | | 715/234 |
| 2012/0311494 A1* | 12/2012 | Laden | G06F 3/0481 |
| | | | 715/810 |
| 2013/0080881 A1* | 3/2013 | Goodspeed | G06F 40/10 |
| | | | 715/251 |
| 2013/0268508 A1* | 10/2013 | Bracher | G06Q 30/02 |
| | | | 707/709 |
| 2013/0346906 A1* | 12/2013 | Farago | G06F 3/0483 |
| | | | 715/776 |
| 2014/0080428 A1* | 3/2014 | Rhoads | G06F 16/5838 |
| | | | 455/88 |
| 2014/0089967 A1 | 3/2014 | Mandalia et al. | |
| 2014/0195961 A1* | 7/2014 | Shoemaker | G06F 15/0291 |
| | | | 715/776 |
| 2014/0304579 A1* | 10/2014 | Foster | G06F 3/0481 |
| | | | 715/205 |
| 2014/0337730 A1* | 11/2014 | King | G06F 3/0481 |
| | | | 715/781 |
| 2014/0344753 A1* | 11/2014 | Akasaka | G06F 3/0482 |
| | | | 715/823 |
| 2015/0100920 A1 | 4/2015 | Sanghavi et al. | |
| 2015/0301718 A1 | 10/2015 | Trollope et al. | |
| 2015/0309698 A1 | 10/2015 | Senderek et al. | |
| 2016/0004779 A1* | 1/2016 | Sathish | G06F 16/36 |
| | | | 707/771 |
| 2016/0328142 A1 | 11/2016 | Lee | |
| 2017/0201777 A1 | 7/2017 | Agarwal et al. | |
| 2018/0121825 A1 | 5/2018 | Kumar | |
| 2019/0155949 A1* | 5/2019 | Castaneda | G06F 16/9038 |
| 2020/0137429 A1* | 4/2020 | Strosaker | H04N 21/2668 |
| 2021/0157834 A1* | 5/2021 | Sivasubramanian | |
| | | | G06F 16/686 |

OTHER PUBLICATIONS

"YouVersion Video Library", [Online], Retrieved from the Internet: <URL: https://help.youversion.com/l/en/article/gsw0kru2ia-video-library>, (Accessed online Feb. 15, 2021), 3 pages.

* cited by examiner

INDICATION OF CONTENT LINKED TO TEXT

PRIORITY

This application claims the benefit of priority to U.S. Provisional Patent Application Ser. No. 62/978,127, filed Feb. 18, 2020, which is incorporated by reference here in its entirety.

TECHNICAL FIELD

The subject matter disclosed herein generally relates to the technical field of special-purpose machines that facilitate content linkage, including software-configured computerized variants of such special-purpose machines and improvements to such variants, and to the technologies by which such special purpose machines become improved compared to other special-purpose machines that facilitate content linkage. Specifically, the present disclosure addresses systems and methods to provide a user with content from public sources.

BACKGROUND

A computing device with a display may, when presenting text to a user, indicate that additional relevant information is available. For example, in the case of hyperlinks, the computing device may present text that is underlined and in a different color to indicate to the user that additional information is available. When the user selects the hyperlinked text, the user is redirected to a new screen containing information relating to the hyperlinked word or phrase. Additionally, related information may be provided to a user when a cursor is placed over a graphical user interface (GUI) element without the element being selected (the so-called "mouse-over" effect), by popping up a window of information that is related to the GUI element.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
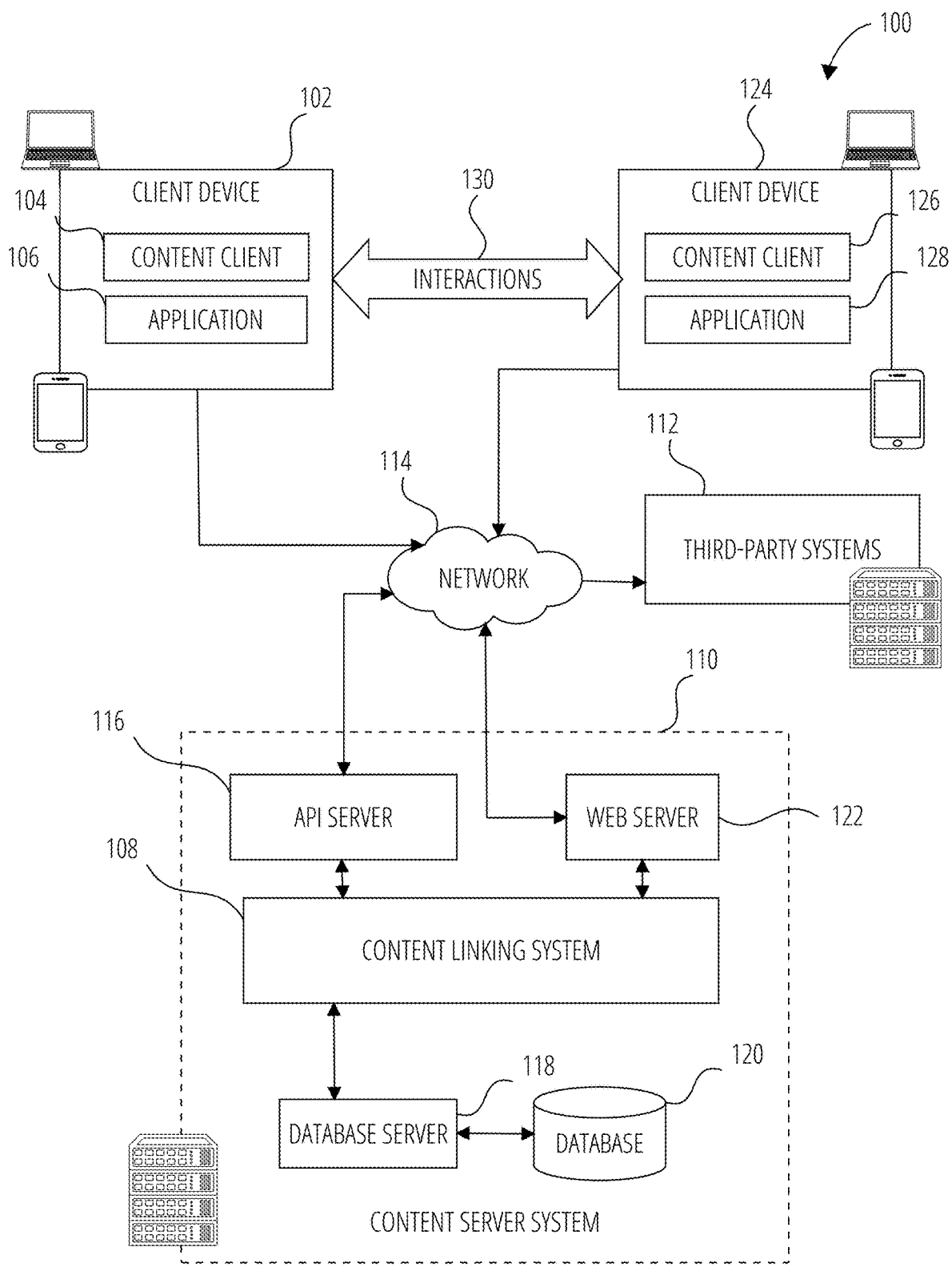
FIG. 1 is a diagrammatic representation of a networked environment in which the present disclosure may be deployed, in accordance with some examples.

Example methods (e.g., algorithms) facilitate content linkage corresponding to primary content (e.g., a reference or authoritative text) presented to a user based on user-selection, and example systems (e.g., special-purpose machines configured by special-purpose software) are configured to facilitate content linkage based on content identified by or provided to a user. For example, the machine may present a text to the device of the user in which specific portions of the text have indicators that provide additional information to the device of the user. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine (e.g., a mobile device or other computing machine) may be specially configured (e.g., by suitable hardware modules, software modules, or a combination of both) to behave or otherwise function as a content linkage indicator. In accordance with the examples of systems and methods described herein, the machine presents a text on a display screen (e.g., controlled by or otherwise in communication with the mobile device). Example methods (e.g., algorithms) facilitate content linkage corresponding to a text presented to a user based on user selection, and example systems (e.g., special-purpose machines configured by special-purpose software) are configured to facilitate content linkage based on a text provided to a user. For example, the machine may present a text to the device of the user in which specific portions of the text have indicators that provide additional information to the device of the user. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine (e.g., a mobile device or other computing machine) may be specially configured (e.g., by suitable hardware modules, software modules, or a combination of both) to behave or otherwise function as a content linking system or any other component described herein. In accordance with the examples of systems and methods described herein, the machine presents a text on a display screen (e.g., controlled by or otherwise in communication with the mobile device).

Networked Computing Environment

FIG. 1 is a block diagram showing an example content system 100 for facilitating data exchange and transmission (e.g., exchanging text messages, conducting text audio and video calls, or playing games) over a network. The content system 100 includes multiple instances of a client device 102, each of which hosts multiple applications, including a content client 104 and other applications 106. Each content client 104 is communicatively coupled, via a network 114 (e.g., the Internet), to other instances of the content client 104 (e.g., hosted on respective other client devices 102), a content server system 110 and third-party systems 112). A content client 104 can also communicate with locally hosted applications 106 using Applications Program Interfaces (APIs).

A content client 104 interacts with other content clients 104 and with the content server system 110 via the network 114. The data exchanged between content clients 104, and between a content client 104 and the content server system 110, includes functions (e.g., commands to invoke functions) as well as payload data (e.g., text, audio, video, or other multi-media data).

The content server system 110 provides server-side functionality via the network 114 to the content clients 104. While certain functions of the content system 100 are described herein as being performed by either a content client 104 or by the content server system 110, the location of certain functionality either within the content client 104 or the content server system 110 may be a design choice. For example, it may be technically preferable to initially deploy certain technology and functionality within the content server system 110 but to later migrate this technology and functionality to the content client 104 where a client device 102 has sufficient processing capacity.

The content server system 110 supports various services and operations that are provided to the content clients 104. Such operations include transmitting data to, receiving data from, and processing data generated by the content clients 104. Data exchanges within the content system 100 are invoked and controlled through functions available via user interfaces (UIs) of the content clients 104.

Turning now specifically to the content server system 110, an Application Program Interface (API) server 116 is coupled to, and provides a programmatic interface to, content linking system 108. The content linking system 108 is communicatively coupled to a database server 118, which facilitates access to a database 120 that stores data associated with contents processed by the content linking system 108. Similarly, a web server 122 is coupled to the content linking system 108 and provides web-based interfaces to the content linking system 108. To this end, the web server 122 processes incoming network requests over the Hypertext Transfer Protocol (HTTP) and several other related protocols.

The Application Program Interface (API) server 116 receives and transmits content data (e.g., commands and message payloads) between the client device 102 and the content linking system 108. Specifically, the Application Program Interface (API) server 116 provides a set of interfaces (e.g., routines and protocols) that can be called or queried by the content client 104 in order to invoke functionality of the content linking system 108. The Application Program Interface (API) server 116 exposes various functions supported by the content linking system 108, including account registration, login functionality, the sending of content data via the content linking system 108, from a particular content client 104 to another content client 104, the communication of content files (e.g., images or video) from a content client 104 to the content linking system 108, the settings of a collection of content data, and the retrieval of messages and content.

Figure 2:
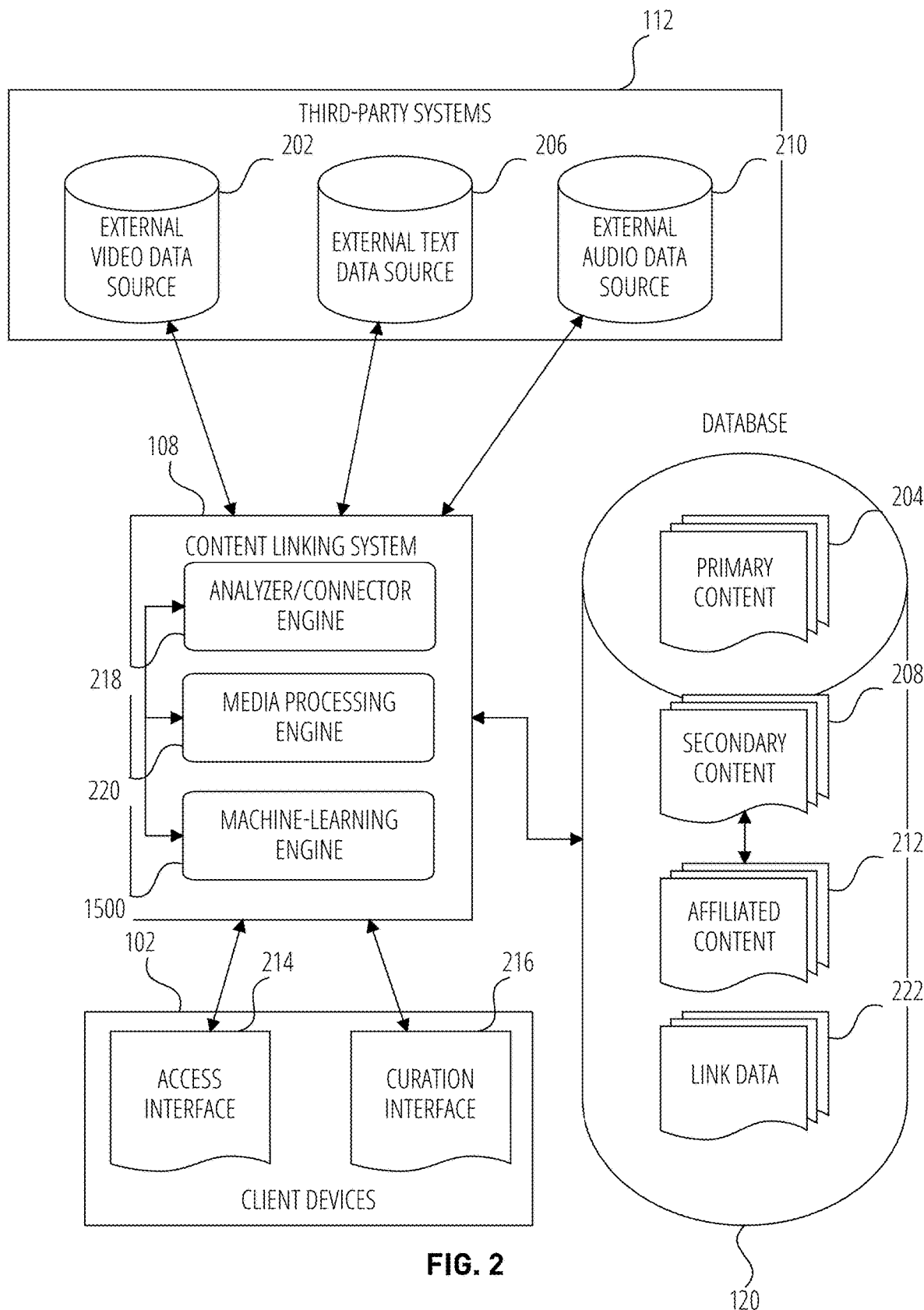
FIG. 2 illustrates an aspect of the subject matter in accordance with some examples.

FIG. 2 is an architectural diagram showing further details of the content linking system 108, as well as external data sources that may be accessed by the content linking system 108 for analysis and processing. The content linking system 108 includes three engines, namely and analyzer/connector engine 218, a media processing engine 220, and a machine-learning engine 1500, which are all communicatively coupled via respective interfaces.

The content linking system 108 accesses several external data sources, maintained by third parties as third-party systems 112, via the network 114 and appropriate interfaces (e.g., APIs). These external data sources may contain data and content that is classified by the content linking system 108 as either primary content (e.g., authoritative or reference works, such as religious texts (e.g., the Bible), textbooks or encyclopedias), secondary content (e.g., commentaries related to various authoritative or reference texts), and affiliated content (e.g., content that may have a less direct connection or association with the primary content). The external content may comprise video data, accessible at an external video data accessible at an external data source 202 (e.g., YouTube), text data accessible at external text data sources 206 (e.g., Wikipedia or various common trees), and audio data accessible at various external data sources 210 (e.g., Spotify, podcast distributors, etc.).

Operationally, the content linking system 108 accesses these various data sources, and, using the analyzer/connector engine 218 in conjunction with the media processing engine 220 and the machine-learning engine 1500, analyzes content to generate metadata relating to this content. Specifically, this metadata may be stored as primary content 204, secondary content 208, and affiliated content 212 within the database 120. The analyzer/connector engine 218 classifies various external bodies of content, for example, as being either primary content, secondary content, or affiliated content, and generate tags, and other data pertaining to this content using predefined rules, or using machine learning implemented by the machine-learning engine 1500. Further, link data is also stored within the database 130, which stores associations between portions of primary content and secondary content and affiliated content.

The media processing engine 220 furthermore downloads licensed, or license-free, content from the third-party systems 112, and performs various editing and curation functions on such authorized copies of the content retrieved from the third-party systems 112.

The content linking system also provides interfaces to client devices 102 so as to enable users to access various information stored within the database 120, and also to access content (e.g., primary, secondary, or affiliated content) from the third-party systems 112, or from copied and processed content stored in the database 120. To this end, the content linking system 108 may cause presentation, on the client devices 120 of an access interface 214, further details of which are described herein, so as to allow a user to easily access and navigate data, and also a curation interface 216 so as to enable human oversight and input to analysis processes performed by the analyzer/connector engine 218.

Figure 3:
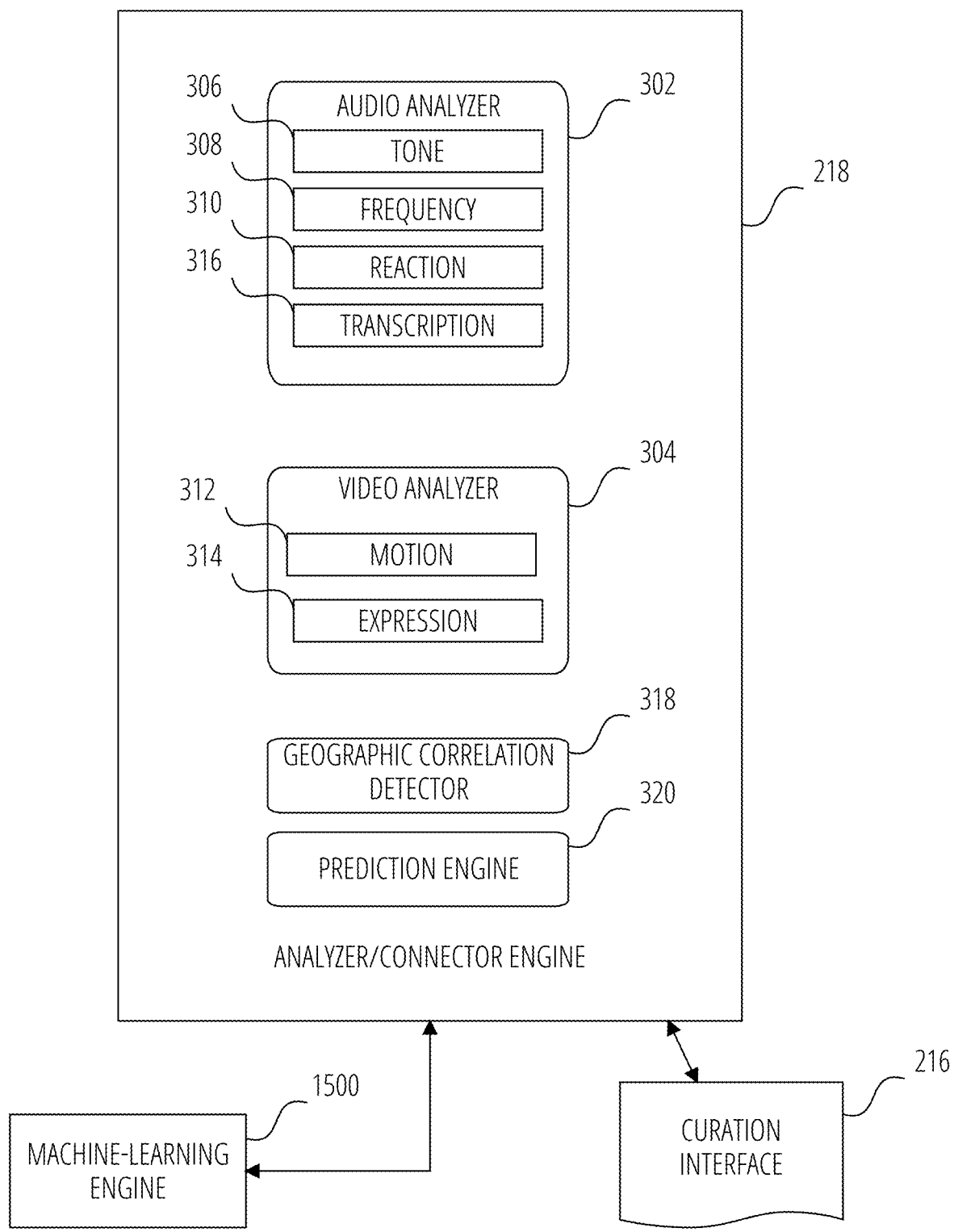
FIG. 3 illustrates an aspect of the subject matter in accordance with some examples.

FIG. 3 is an architectural diagram illustrating further architectural details of the analyzer/connector engine 218, according to some examples. The analyzer/connector engine 218 includes an audio analyzer 302 that incorporates various algorithms for inputting and analyzing audio data. The audio data may be pure audio data or audio data extracted from a video file. For example, the analyzer/connector engine 218 may connect to an external video data source 202 (e.g., YouTube), and analyze the audio associated with a particular YouTube video to isolate either a speaker or audience audio data. Speaker audio data is analyzed to detect changes in tone 306 or frequency 308 by the speaker and, based on these changes, to identify portions of the speaker's presentation that the speaker may want to particularly emphasize or highlight. Subtle changes in tone, volume, cadence, or frequency may furthermore be processed by the machine-learning engine 1500 to also identify portions of the audio from which various inferences can be made, and accordingly, tags generated. For example, where an audio model for a particular speaker is built (e.g., a famous or well-known orator), certain patterns in an audio presentation by the speaker may be identified by a trained machine-learning program 1510 as signaling key points based on previous training data 1504 for that particular speaker and that has been used as input to the machine-learning engine 1500. For a particular speaker, various features 1502 may be identified, and a model constructed for use by the machine-learning engine 1500.

In a similar manner, the audio analyzer 302 identifies and filters audience audio data in order to identify audience reactions to certain presentation content. Loud applause from an audience or verbal feedback to the speaker may be used to identify portions of a presentation that are particularly important, or have some other characteristic (e.g., a key point) that can then be a user to generate a tags, or other metadata, for portions of an overall presentation. Additionally, the audio analyzer 302 may generate transcription of a speaker's presentation to allow for analysis of speech content Using the sum of several factors, characteristics, and attributes of an audio file processed by the audio analyzer 302, certain portions of an audio presentation may be identified as being related to a certain topic, or as mentioning an authoritative or reference content (e.g., the Bible), and these portions then tagged by the analyzer/connector engine 218 accordingly. For example, where a preacher mentions a particular portion of Scripture, and changes his or her tone and frequency around the subsequent text, the analyzer/connector engine 218 may tag that specific portion of the audio presentation with keywords identifying pertinent passages of Scripture and also tag that portion as being a key point based on various other attributes observed in and extracted from the audio data.

The analyzer/connector engine 218 also includes a video analyzer 304 that includes algorithms to perform several analytic operations on video data accessed at a third-party systems 112. For example, the video analyzer 304 analyzes video data to identify a speaker within a YouTube video and then analyzes movement on a stage of that speaker to identify key or important portions of the presentation that the speaker may have intended to emphasize. Here, the machine-learning engine 1500 again assists the video analyzer 304 by constructing a model, including a trained machine-learning program 1510, for a particular speaker and be trained to identify that the speaker characteristically stands up (or performs some other motion) when making a key point or wishing to particularly engage with an audience. The portion of the video where the speaker is then standing may be delimited (e.g., the begin and end timestamps recorded) and tagged as being important based on this analysis of the video. In a similar way, the video analyzer 304 may analyze an expression 314 of a speaker, based on a model of that speaker (or a more generalized model) to identify and delimit key portions of a presentation and tag or generate other metadata pertaining to those key portions.

The analyzer/connector engine 218 also includes a geographic correlation detector 318, which operates to analyze content, generated at multiple geographic locations, to determine any trends or cross-pollination of ideas, for example. Using time information and geographic location information, the geographic correlation detector 318 may identify topic trends (e.g., a number of speeches or sermons are being presented in a geographically broad manner, but pertaining to a common topic), or that a specific topic is being presented with increasing frequency within a particular geographic area. Consider, for example, that many preachers internationally may be broadcasting recorded sermons all dealing with a particular issue, or referencing a common Scripture within a determinable time window. The geographic correlation detector 318 may detect these correlations and surface information (e.g., within the access interface 214 or the curation interface 216) for presentation to an end-user or a curator.

The analyzer/connector engine 218 also includes a prediction engine 320 that generates predictive metadata and content pertaining to a particular authoritative text, based on inferences from other content generated by that particular author. Consider that even though a particular preacher or pastor may not have commented on a specific Scripture, the prediction engine 320 may operate to analyze many of the preachers previously generated comments and commentary (e.g., videos, blog posts, podcast interviews) on a broad range of Scripture, identify content from that preacher that is most similar to a particular portion of Scripture, and then make inferences regarding a further portion of Scripture, regarding which the preacher may not have generated specific content. In this way, a user may have the option to see what, for example, the Pope probably would have said about a particular portion of Scripture-based on a prediction made by the prediction engine 320.

Figure 4:
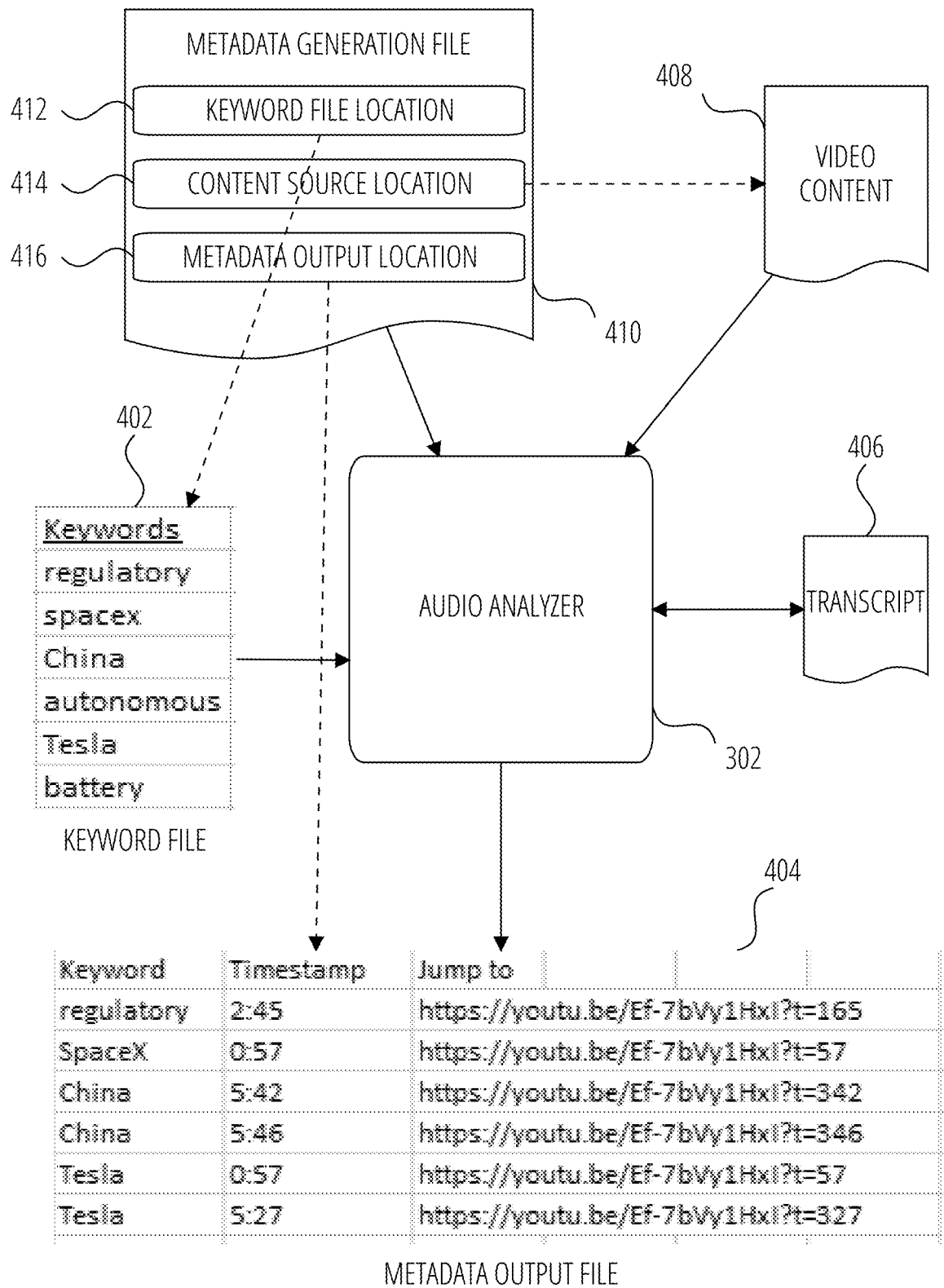
FIG. 4 illustrates an aspect of the subject matter in accordance with some examples.

FIG. 4 is a diagrammatic representation of various inputs and outputs for the audio analyzer 302, according to some examples. A metadata generation file 410 is generated based on input received from an end-user via the access interface 214 or from a curator via the curation interface 216 and specifies a keyword file location 412 of a keyword file 402. The keyword file 402 includes a number of keywords (e.g., corresponding to topics of interest) that provide input into the audio analyzer 302. The metadata generation file 410 further includes a content source location 414, identifying the location of content (e.g., video content 408) to be analyzed by the audio analyzer 302. Finally, the metadata generation file 410 includes a metadata output location 416 to which the audio analyzer 302 outputs metadata, in the form of a metadata output file 404. The metadata output file 404 embodies the results of the audio analysis performed on the video content 408. Operationally, the metadata generation file 410 is accessed and read by the audio analyzer 302, which then accesses the keyword file 402 to retrieve a list of keywords embodied in that file. In the example shown in FIG. 4, the video content 408 is an interview or presentation presented by Elon Musk, the CEO of Tesla Motor Corporation and SpaceX. In this case, the list of keywords embodied in the keyword file 402 identify certain topics of point of interest to be identified within the video content 408. On accessing the video content 408, the audio analyzer 302 generates a transcript 406 of the speaker audio data embodied within the video content 408 (e.g., audio generated and spoken by Elon musk), which is processed and analyzed to identify utterances corresponding to the keywords in the keyword file 402. Based on this analysis, the audio analyzer 302 identifies segments or portions of the video content and associate these segments or portions with one or more of the keywords in the keyword file 402. The metadata output file 404 includes a number of records or line items corresponding to sections or portions of the video content 408 and, for each video segment, records an associated keyword and a timestamp for a particular portion or segment. The metadata output file 404 is then stored within the database 120 as an example of secondary content 208 and link data 222.

Similar inputs may be provided to the video analyzer 304 for analysis of image data embodied in the video content 408.

Figure 5:
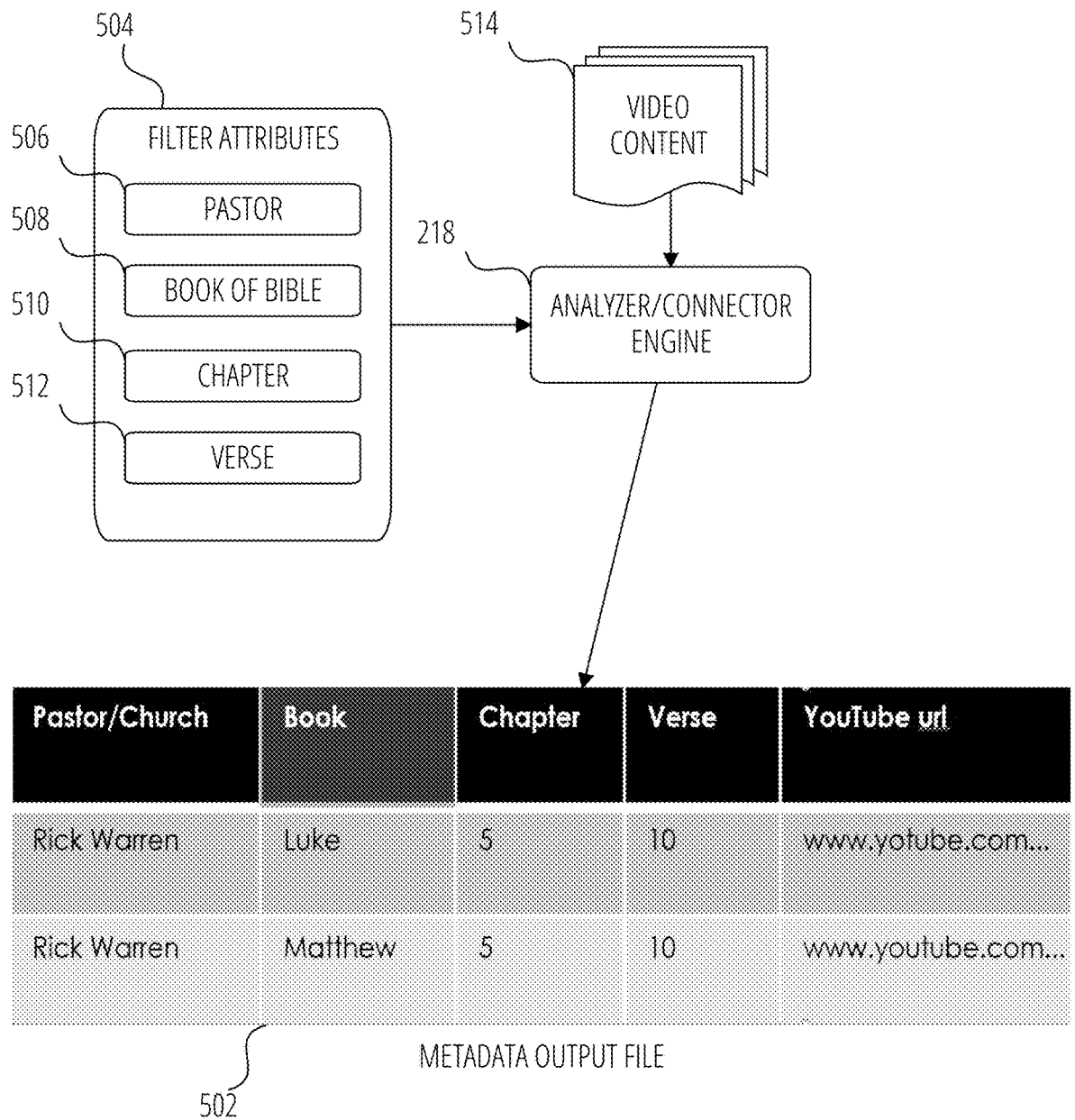
FIG. 5 illustrates an aspect of the subject matter in accordance with some examples.

FIG. 5 is a further example showing inputs and outputs to the analyzer/connector engine 218, according to some examples. In the illustrated example, a number of filter attributes 504, and video content 514 provide input to the analyzer/connector engine 218, which then generates a metadata output file 502 based on these inputs. The filter attributes 504 provide input from either an end-user received via the access interface 214 or from a curator received via a curation interface 216, and include identifiers for a particular speaker (e.g., a pastor 506), primary content (e.g., a book of bible 508), as well as primary content portion identifiers (e.g., information, identify a chapter 510 and a verse 512). These inputs are then used by the analyzer/connector engine 218 to analyze multiple instances of video content 514 (e.g., multiple sermons and recorded presentations by the pastor, Rick Warren) to identify references by the pastor 506 to the specific portions of the primary content (e.g., to specific chapters and verses of the Christian Bible). Based on this analysis performed by the analyzer/connector engine 218, the metadata output file 502 is generated, the metadata output file 502 identifying a particular pastor, book, chapter, and verse, and link to a specific location within a YouTube video at which the relevant chapter and verse of the relevant book of the Christian Bible are mentioned by the pastor. The metadata output file 502 provides an example of secondary content 208 and link data 222 that may be stored by the content linking system 108 within the database 120.

Figure 6:
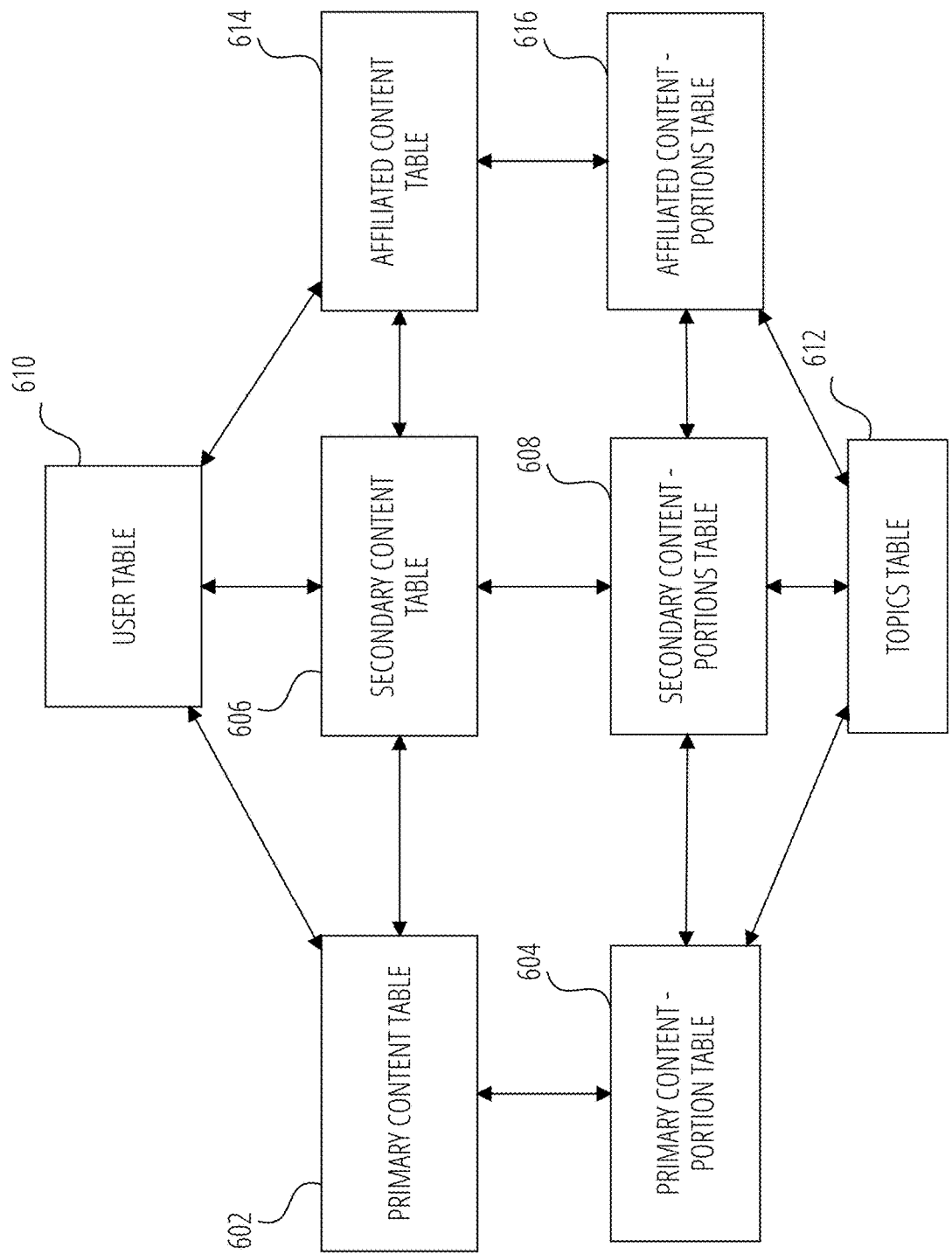
FIG. 6 illustrates an aspect of the subject matter in accordance with some examples.

FIG. 6 is a data diagram showing further details of the primary content 204, secondary content 208, and affiliated content 212 stored within the database 120 and various other data types. A user table 610 stores data regarding a particular user and their preferences. For example, the stored user data may include user identifiers, and identification of selected primary content (e.g., reference works), a list of selected sources of secondary content (e.g., a list of preferred authors, commentators, speakers, artists, etc.), and a list of preferred affiliated content (e.g., other sources of information and content). A primary content table 602 stores identification information for various primary content (e.g., authoritative reference works) and metadata pertaining to such primary content. Further, a primary content—portion table 604 contains records for specific portions of primary content (e.g., specific passages or verses within scriptures) and associated metadata for such portions.

A secondary content table 606 stores information pertaining to secondary content, such as a secondary content source or generator (e.g., an author or a preacher), metadata pertaining to specific instances of secondary information from the relevant source (e.g., metadata pertaining to a particular sermon from a preacher), and also links to affiliated content, recorded within the affiliated content table 614. As with primary content, a secondary content—portions table 608 stores information pertaining to particular portions of secondary data, such as the start and end time of a particular segment of a video presentation, as well as metadata pertaining to that segment, including whether the segment was a key point, a reference to Scripture, a repeated topic, etc.

The affiliated content table 614 and affiliated content—portions table 616 stored information pertaining to affiliated content. Primary content, secondary content, and affiliated content may furthermore be organized around certain topics that are stored in a topics table 612. Tags, generated by the analyzer/connector engine 218, are used to organize portions of primary, secondary, and affiliated content around various identified topics.

Figure 7:
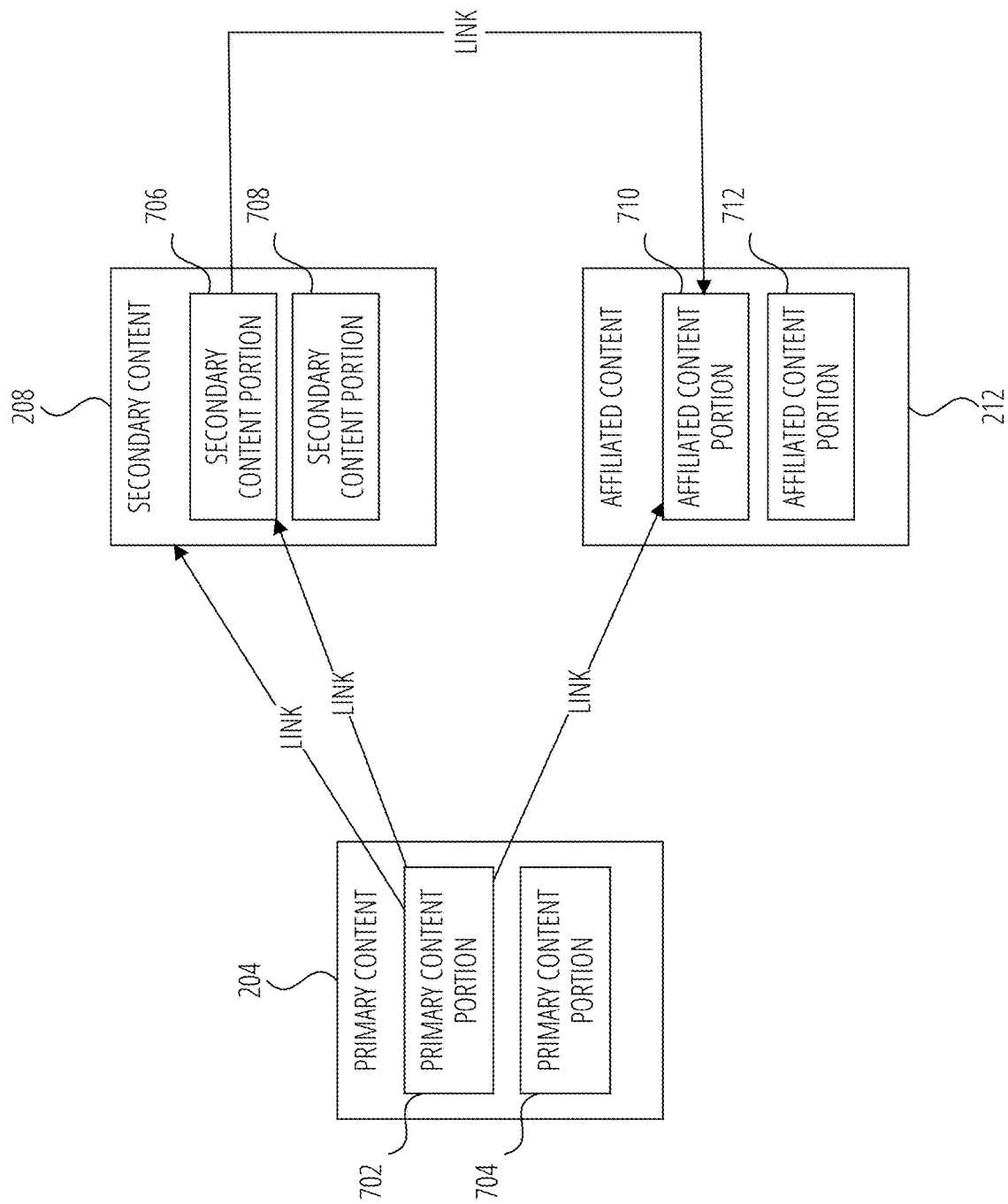
FIG. 7 illustrates an aspect of the subject matter in accordance with some examples.

FIG. 7 is a further data diagram illustrating how a particular instance of primary content 204 includes multiple content portions, including primary content portion 702 and primary content portion 704, each of which may be linked to secondary content 208, as well as secondary content portions, such as secondary content portion 706 or secondary content portion 708. Affiliated content 212 is also shown to include content portions, namely affiliated content portion 710 and affiliated content portion 712, which may also be linked using link data to a primary content portion 702.

Figure 8:
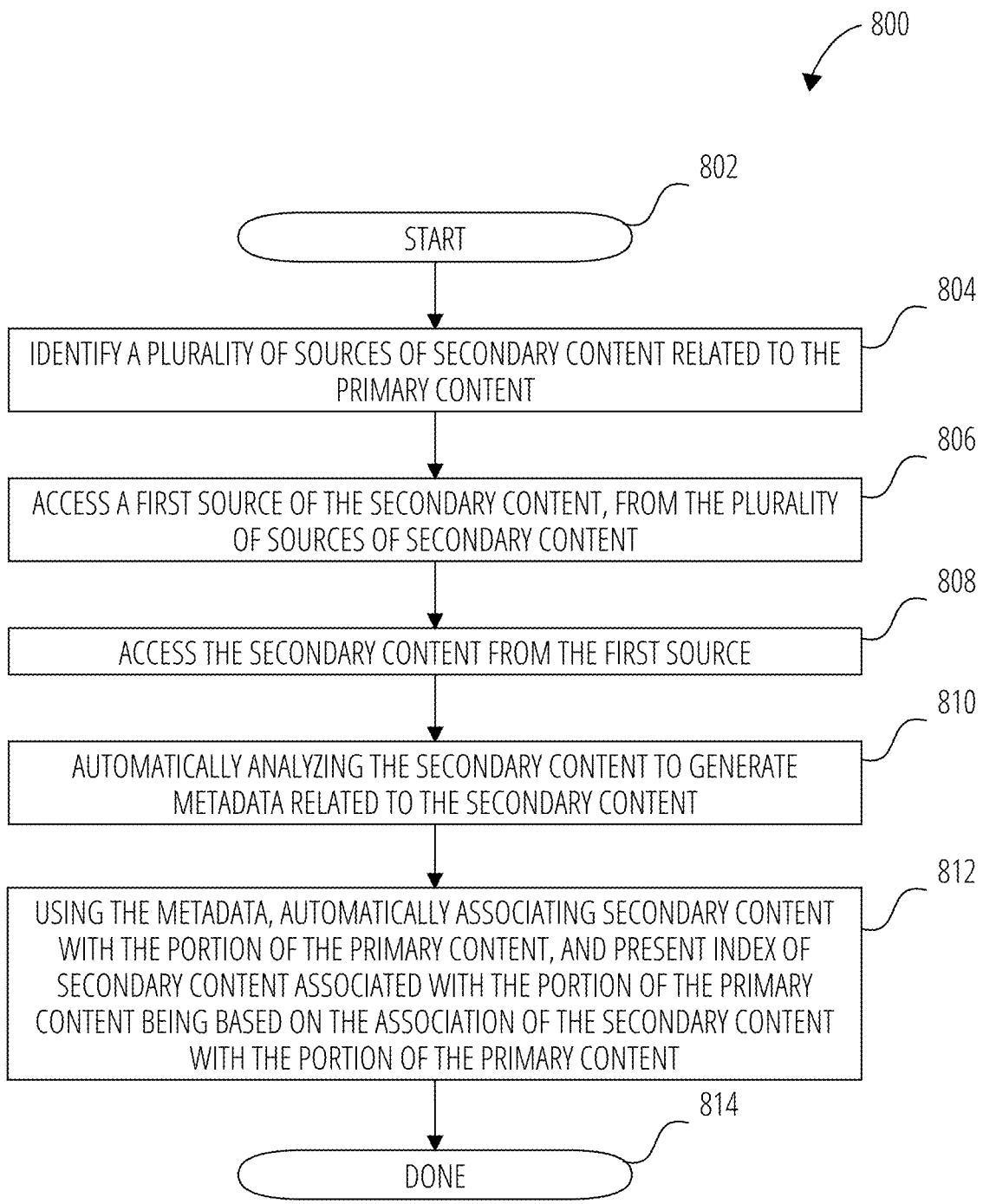
FIG. 8 illustrates a method 800 in accordance with some examples.

FIG. 8 is a flowchart illustrating a method 800, according to some examples, that may be performed by the content linking system 108, to access, ingest and process source data (e.g., primary content, secondary content, and/or affiliated content) to generate metadata and processed content data to be stored within the database 120.

The method 800 commences at block 802, and proceeds to block 804, where the content linking system 108 identifies several sources of content, including secondary content, related to primary content. For example, where the primary content is the Christian Bible, a number of secondary content sources (e.g., particular authors or publishers of content, as well as platforms on which such authors publish content) may be identified. The identified sources of secondary content related to the Christian Bible may, for example, include a well-known speaker that publishes his or her recorded talks or sermons on YouTube or blogs or podcasts that are produced by that particular content generator. A curation team associated with the content linking system 108 may be responsible, in some examples, for identifying these sources of secondary content, while in some examples, sources of secondary content may be provided by users of client devices 102 via an access interface 214 of a content client 126. In further examples, the content linking system 108 automatically analyzes particular primary content, and perform an automated survey or search of publicly available data sources on third-party systems 112 to identify many sources (e.g., authors or platforms) related to a specifically identified instance of primary content At block 806, the content linking system 108 may then access a specific, first source of secondary content (e.g., YouTube) from among the identified sources of secondary content, and then access specific secondary content (e.g., a sermon by a preacher) related to the primary content (e.g., the Christian Bible) from that first source. The access, where permitted, may include downloading and storing a copy of the secondary content at the content linking system 108.

At block 810, the content linking system 108 performs an automatic analysis of the secondary content to generate metadata (e.g., tags, links, delimiters, etc.) related to the secondary content. Further details regarding operations performed during this analysis are described with reference to FIG. 9.

At block 812, the content linking system 108, using the metadata generated at block 810, automatically associates the secondary content with a specific portion of the primary content. For example, a preacher's sermon relating to a particular verse within the Christian Bible may be associated with that verse within the primary content (e.g., a digital version of the Christian Bible). As will be described in further detail below, an index or list of secondary content associated with the relevant portion of primary content may then be generated and presented to a user, in a manner indicating an association with the portion of primary content, within an access interface 214. The method 800 is then terminates at block 814.

Figure 9:
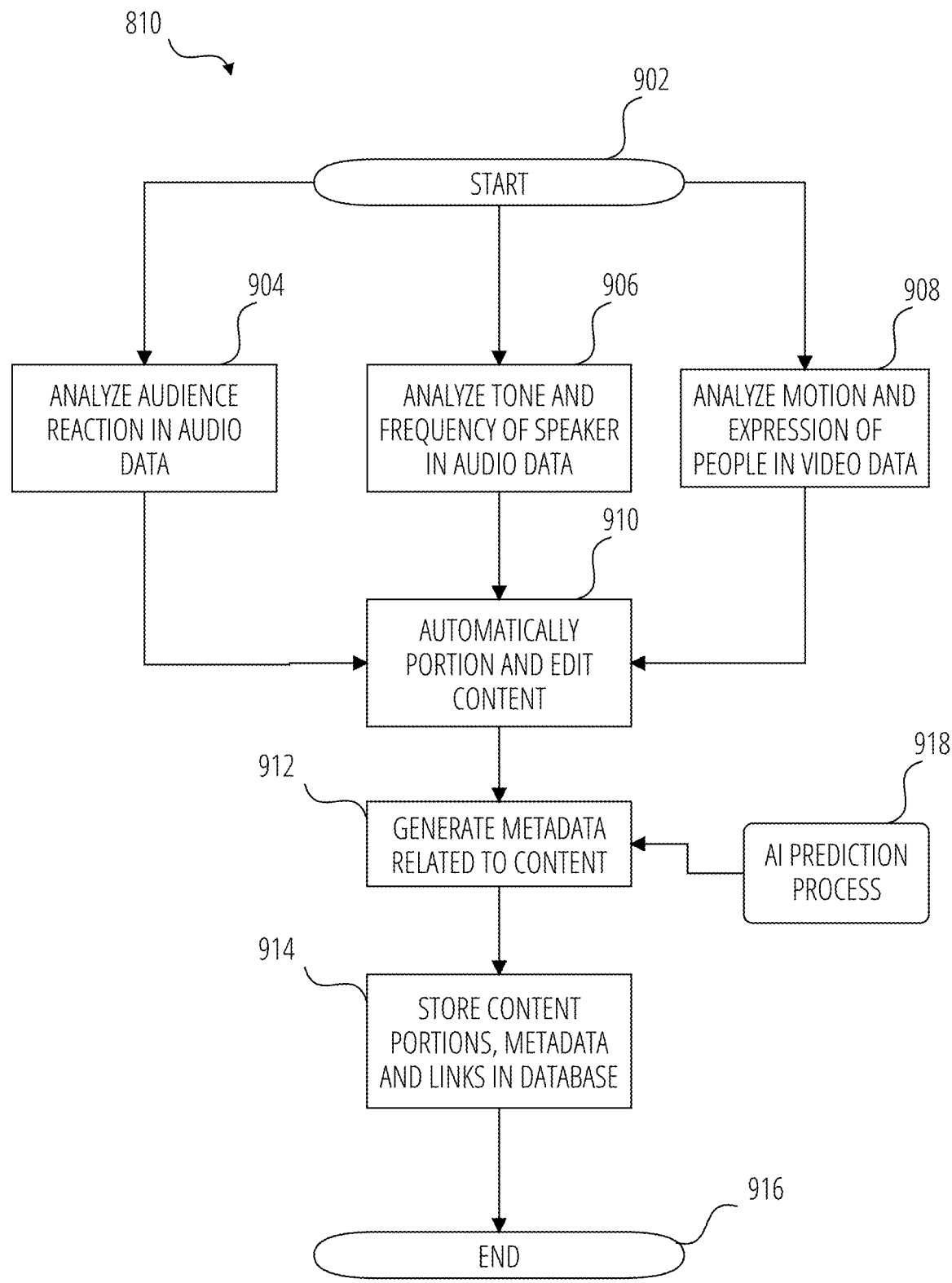
FIG. 9 illustrates an aspect of the subject matter in accordance with some examples.

FIG. 9 is a flowchart illustrating further operations of the analysis performed by the content linking system 108 at block 810 of the method 800. Following a start at block 902, and having accessed secondary content (e.g., YouTube video, accessible by the YouTube platform), the audio analyzer 302, video analyzer 304, geographic correlation detector 318, and prediction engine 320 are deployed to perform various functions. Specifically, at block 904, the audio analyzer 302 operates to extract audience audio data from the overall audio data of a presentation video, and performs an analysis of audience audio reactions to identify particular portions of the video in which an audience may have reacted either favorably or unfavorably to a speaker's presentation. Similarly, at block 906, the audio analyzer 302 identifies and extracts speaker audio from an overall audio data of a presentation and analyzes the speaker audio data to identify tone, frequency, cadence, volume, and other characteristics to identify portions of the presentation.

At block 908, the video analyzer 304 isolates and identifies motion and expression for presenters within the video data in order to identify and tag certain portions of the overall video presentation based on these detected and observe characteristics of the speaker. As noted above, the machine-learning engine 1500 may be employed within each of block 904, block 906 and block 908 to make inferences regarding a particular portion of the video and audio data. To this end, specific models for a number of sources of secondary data (e.g., public speakers or authors) may be constructed, and a trained machine-learning program 1510 trained based on a body of previous content generated by that author, in order to generate tags for analyzed content. These tags may, for example, denote a particular portion of a talk (e.g., a TED talk) as being key points, repeated points, or other highlighted portions.

At block 910, based on the analyses performed at block 904, block 906, and or block 908, the content linking system 108 automatically portions or segments the analyzed secondary content. In some examples, the portioning includes flagging segments or portions of a broader body of secondary work. Further, where edit permissions are available, the media processing engine 220 of the content linking system 108 may generate discrete segments of portions of the content for storage within the database 120. For example, considering a particular TED talk having a duration of 20 minutes, based on the analysis, the content linking system 108 may identify key portions of the TED talk, and also identify a main point or topic associated with those key portions. The start and end times, within the context of the total duration of the TED talk, are stored and identified with particular portions. Further, where edit permissions are available, the media processing engine 220 extracts and individually stores relevant portions of the TED talk (e.g., a 30 second segment addressing a particular issue)

At block 912, the analyzer/connector engine 218 of the content linking system 108 operates to generate metadata related to the secondary content, both as a whole, and for the portions of segments identified (and generated). At block 910, an AI prediction process 918, supported by the prediction engine 320 and the machine-learning engine 1500, may be deployed at block 912 to generate predictive or speculative tags or associations for the body of secondary content as a whole, or for specific portions of the secondary content as described above.

At block 914, the content linking system 108 proceeds to store the generated metadata, as well as content portions (e.g., as data or as identified delimiters), and links within the database 120. This data may be stored in tables for the primary content 204, secondary content 208, affiliated content 212, and as the link data.

Figure 10:
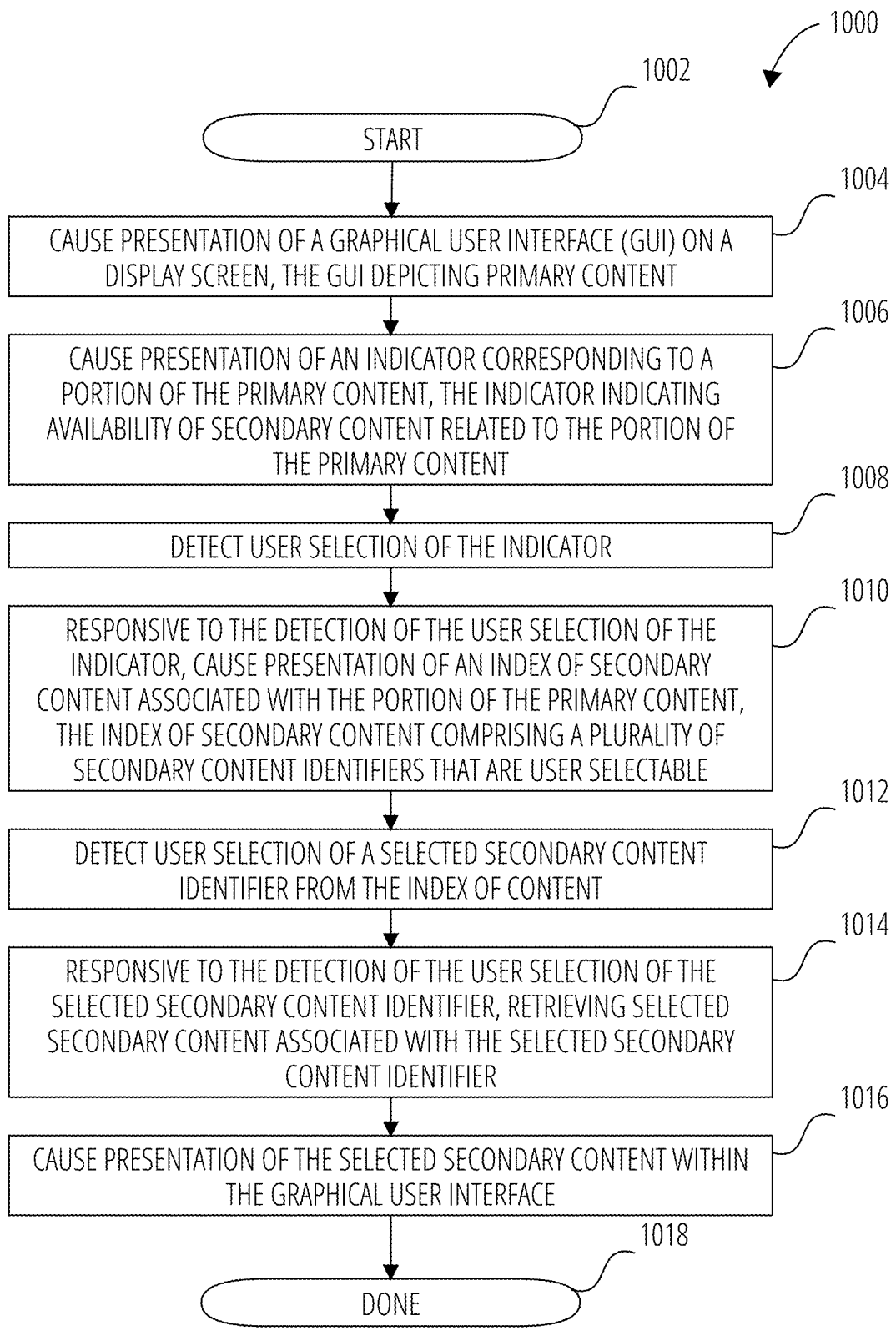
FIG. 10 illustrates a method 1000 in accordance with some examples.

FIG. 10 is a flowchart illustrating a method 1000, according to some examples, to present secondary content (e.g., text, audio, or video clips) in association with primary content (e.g., an authoritative or reference work). The method 1000 is computer-implemented, in some examples, by the content linking system 108 described above.

Figure 12:
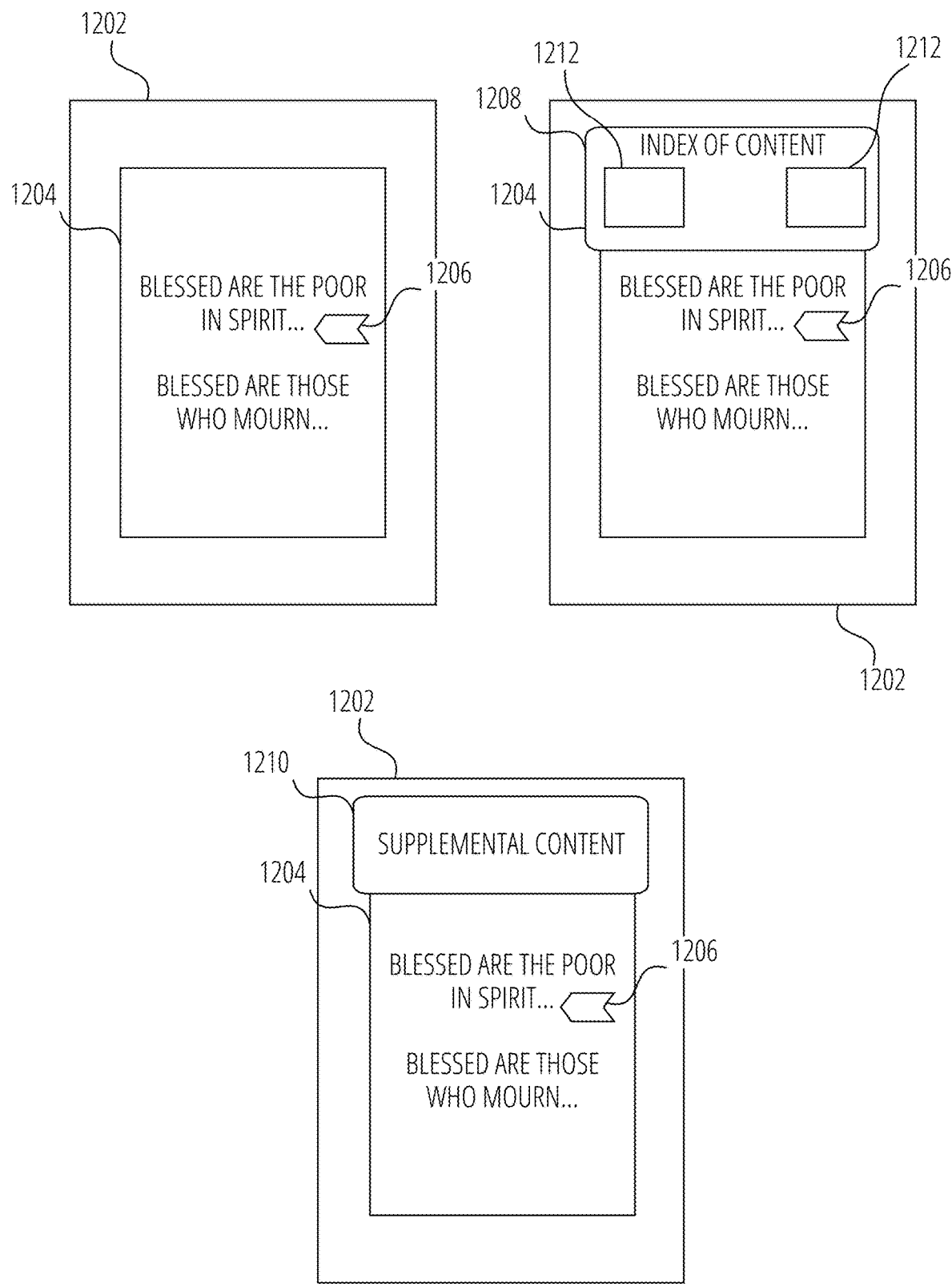
FIG. 12 illustrates an aspect of the subject matter in accordance with some examples.

The method 1000 commences at block 1002, and progresses to block 1004, where the content linking system 108 causes the presentation of a graphical user interface, in the example form of the access interface 214, on the display screen of a client device 10. The graphical user interface depicts primary content. Referring to FIG. 12, an example is shown in which the primary content may be a body of text 1204 (e.g., certain passages and verses from the Christian Bible).

At block 1006, the content linking system 108 causes presentation of an indicator (e.g., the indicator 1206 shown in FIG. 12), corresponding to a portion of the primary content (e.g., a verse of the biblical text), the indicator 1206 indicating, to a user, availability of secondary content related to the portion of primary content.

At block 1008, the content linking system 108 detects user selection of the indicator 1206 and, at block 1010, responsive to the detection of the user selection of the indicator, causes presentation of an index of secondary content (e.g., the index of content 1208 as shown in FIG. 12) that is associated with the portion of the primary contents. The index of secondary content comprises a number of secondary content identifiers 1212 that are user-selectable. Each secondary content identifier 1212 may be associated with a particular source of secondary content, such as a particular author, a particular publisher, a particular platform, or a combination of the above.

At block 1012, the content linking system 108 detects user selection of a selected secondary content identifier 1212 from the index of content 1208, and at block 1012, responsive to the detection of the selection, retrieves selected secondary content, associated with the selected secondary content identifier 1212. Where a secondary content identifier 1212 identifies a source or generator of secondary content (e.g., an author or speaker), the supplemental content 1210 presented at block 1016 may be multiple instances or portions of secondary content, identified with a single larger body of secondary content (e.g., a 2-hour video) from the identified source, or identified with a number of bodies of secondary content (e.g., a number of short video posts on Instagram) from the identified source.

At block 1016, the content linking system 108 causes presentation of the selected secondary content (e.g., supplemental content 1210) within the graphical user interface.

Figure 11:
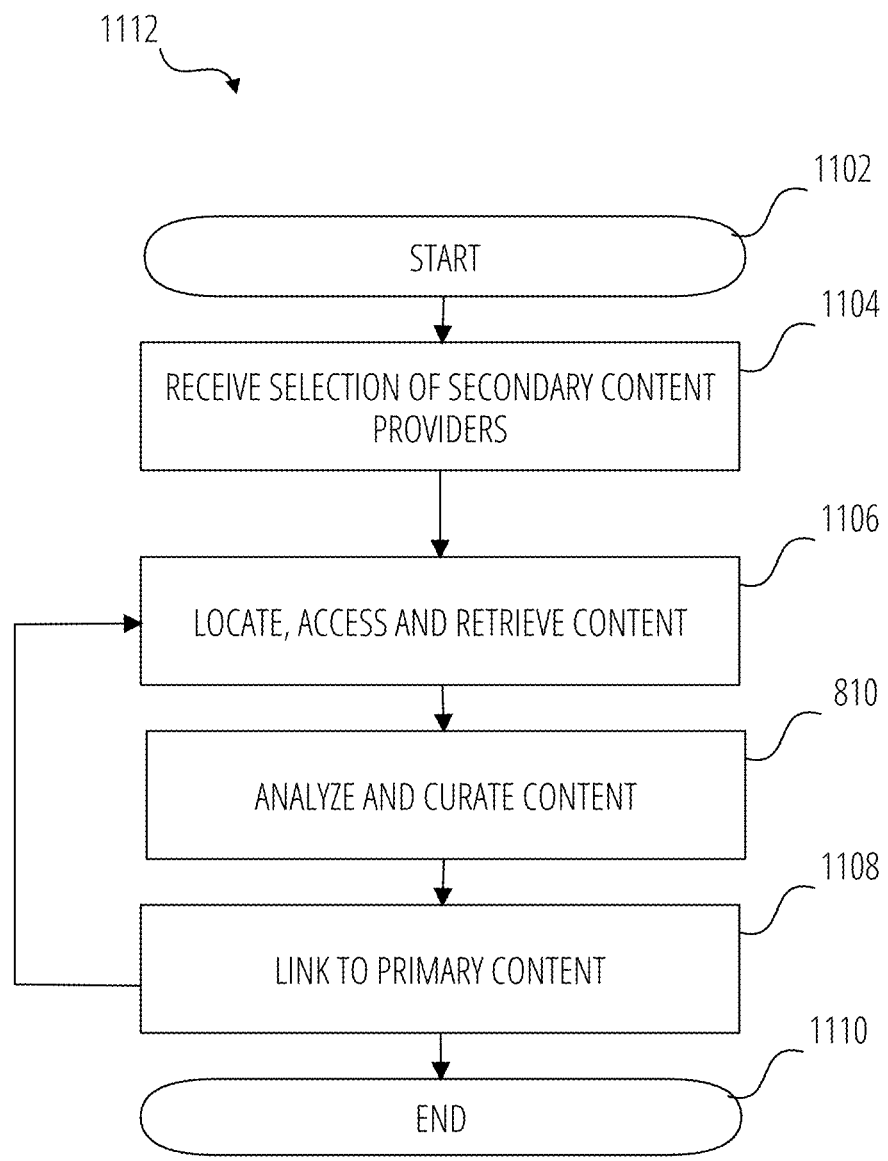
FIG. 11 illustrates an aspect of the subject matter in accordance with some examples.

FIG. 11 illustrates an example of a machine-implemented method 1112 for the provision of content by a content system 100. The method 1112 commences at block 1102. A content provider (e.g., from the third-party systems 112) is selected by the content linking system 108, and this selection is received at block 1104. The content comes from various public or private content sources (e.g., external video data source 202, external text data source 206, and external audio data source 210).

The content linking system 108 controls the selection of the content. Users of the content client 126 are able to add related content by uploading related content onto the content linking system 108, or by providing suggestions for new content or content providers. Alternatively, users may be able to vote on particular content that is proposed by the content linking system 108 for inclusion in the database 120 or vote on particular content providers that are proposed for inclusion in the list of available content providers. Similarly, users may be able to rate content or content providers to assist in identifying the best content or content providers.

Next, the content linking system 108 gathers content at block 1106. The content linking system 108 is able to access the content sources selected in block 1106, over the network 114 to retrieve content. The function of the retrieval of content across a network 114 is accomplished through the system processes as shown and described herein. The content gathered may be various types of content. For example, the content may be books, articles, and/or newspapers. Alternatively, or additionally, the content may be sermons and/or live talks. Alternatively, or additionally, the content may be podcasts and/or videos. Alternatively, or additionally, the content may be blogs and/or other online resources. The content can be from any reasonable source associated with the text. The content may be gathered from public sources. Alternatively, or additionally, the content may be gathered from private sources.

Once the content is gathered, it is analyzed at block 810 for specific content by the analyzer/connector engine 218. An algorithm of the analyzer/connector engine 218 is also used to curate the content at block 810. Alternatively, or additionally, the content linking system 108 is programmed to search for relevant content on public sources without a specific content provider being selected.

Finally, the retrieved content is linked, the analyzer/connector engine 218, at block 1108 to an excerpt from the authoritative (or other reference) work and the record of the authoritative work on the system is marked with indicators 1206 to indicate the availability of the retrieved content as a supplement to the excerpt when the excerpt is provided to the user's device. For example, the content may be linked to scripture.

The content analysis and gathering by the content linking system 108 may be a continuous process in which content is gathered, replaced, and improved as more content becomes available. In one example, the content linking system 108 may connect to audio or video sources and scan the tone of a speaker's voice in recordings hosted on the audio or video sources, as described herein. For example, in a sermon, the tone of the speech of the pastor may change as the pastor is emphasizing certain points in his sermon. The audio analyzer 302 is configured to identify the changes of tone to identify that what is being spoken about is particularly important, and to perform speech-to-text recognition on that portion of the sermon. The audio analyzer 302 will thus automatically create a text portion that can be analyzed by the content linking system 108 for potential inclusion as content in the database 120.

in FIG. 12, a graphical user interface 1202 is presented by the content client 104 to a user of a client device 102. The graphical user interface 1202 includes primary content in the example form of a body of text 1204. The body of text 1204 may be from an authoritative work. For example, the body of text 1204 may be a biblical passage. Optionally, the body of text 1204 may be a story. Optionally, the body of text 1204 may be from a book. Optionally, the body of text 1204 may be from a newspaper. The body of text 1204 may comprise of various sentences or phrases or verses. A sentence or phrase may have an indicator 1206 placed next to the end of the phrase or sentence. Additionally, or alternatively, the indicator 1206 may be placed below the phrase or sentence. Additionally, or alternatively, the indicator 1206 may be placed above the phrase or sentence. The indicator 1206 may be a picture or a shape (e.g. cloud or a balloon). Optionally, the indicator 1206 may be colored. The indicator 1206 indicates to the user that further information is available.

As shown in FIG. 12, upon selecting the indicator 1206, an index of content 1208 is displayed overlaid on the graphical user interface 1202. The index of content 1208 includes several secondary content identifiers 1212, each secondary content identifier 1212 being associated with a respective source of secondary content (e.g., an author, speaker, YouTube channel, blog site) or associated with a specific body of secondary content (e.g., a book, treatise, or collection of publications).

The index of content 1208 may be a drop-down list of content items. Alternatively, or additionally, the index of content 1208 may be displayed horizontally. The index of content 1208 may be images or words. The index of content 1208 may be displayed over the body of text 1204 without re-directing the user to another screen or site. Alternatively, or additionally, the index of content 1208 may be displayed next to the body of text 1204 without re-directing the user to another screen or site. Alternatively, or additionally, the index of content 1208 may be displayed under or above the body of text 1204 without re-directing the user to another screen or site. The user may be able to simultaneously see the phrase or sentence associated with the indicator 1206 and the index of content 1208 associated with the body of text 1204 as shown by selecting the indicator 1206.

The user has the ability to select, from the index of content 1208 and by selection of secondary content identifiers 1212, a source or an item from one or more of a number of sources (e.g., external video data sources 202, external video data sources 202, or external audio data sources 210), to be displayed via the access interface 214 on the client device 102 of the user. In one example, the user may be able to choose an item represented by a secondary content identifier 1212 from single source of content, to be displayed on graphical user interface 1202. Alternatively, or additionally, the user may be able to choose items, by selecting multiple secondary content identifiers 1212 from multiple sources of content, to be displayed on the graphical user interface 1202. The selection may be by the user touching over the indicator 1206 if the display is a touch screen or by placing a cursor over the indicator 1206 and clicking a button on a mouse or performing some other affirmative selection.

Continuing with FIG. 12, after a secondary content identifier 1212 is selected from the index of content 1208 by the user, secondary content in the example form of supplemental content 1210 relating to a selected secondary content identifier 1212 is displayed to the user by the access interface 214 within the graphical user interface 1202. The supplemental content 1210 may be an image, video, audio, text, or combination of these content types. The supplemental content 1210 presented may have additional links to supplemental content (e.g., affiliated content 212), for example a hyper-link may be provided that enables the user to navigate to the supplemental content.

Figure 13:
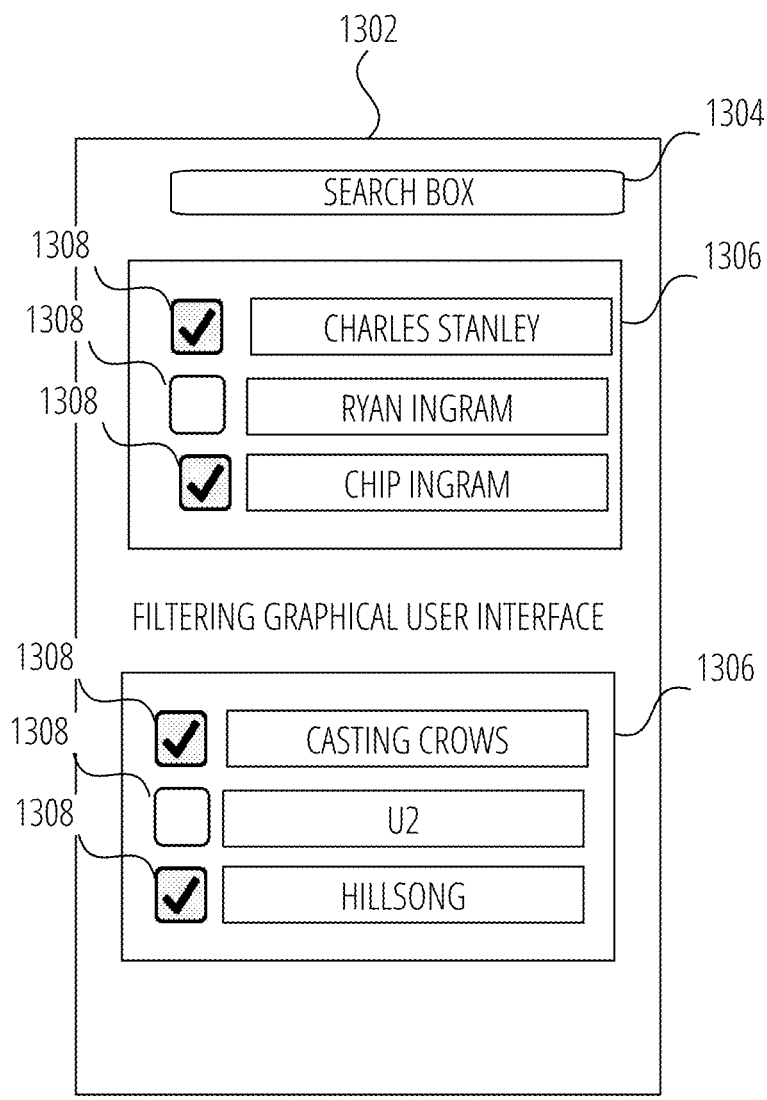
FIG. 13 illustrates an aspect of the subject matter in accordance with some examples.

FIG. 13 illustrates an example embodiment of a filtering capability associated with a filtering graphical user interface 1302 of the access interface 214 on the client device 102 of a user. The graphical user interface 1302 may be presented within the access interface 214 before the user selects the indicator 1206. Alternatively, the filtering graphical user interface 1302 may be presented after the indicator 1206 is selected and the user is able to view the index of content 1208. In any example, a drop-down list 1306 may be presented to the user in which the user can select filter attributes 1308 relating to the secondary content 208. The user may be able to filter based on content type or the identity of a person, e.g., an author, speaker or composer or other content creator. Alternatively, or additionally, the user may be able to filter based on content medium or type (e.g., text, audio, or video). Alternatively, or additionally, the drop-down list 1306 may provide the user with a list of content associated with the primary content 204 in which the user can specify the content desired by selecting the content. Alternatively, or additionally, the user may be able to specify the content desired in a text box. Alternatively, or additionally, the user may have the ability to search in a search box 1304 for a specific piece of content.

Figure 14:
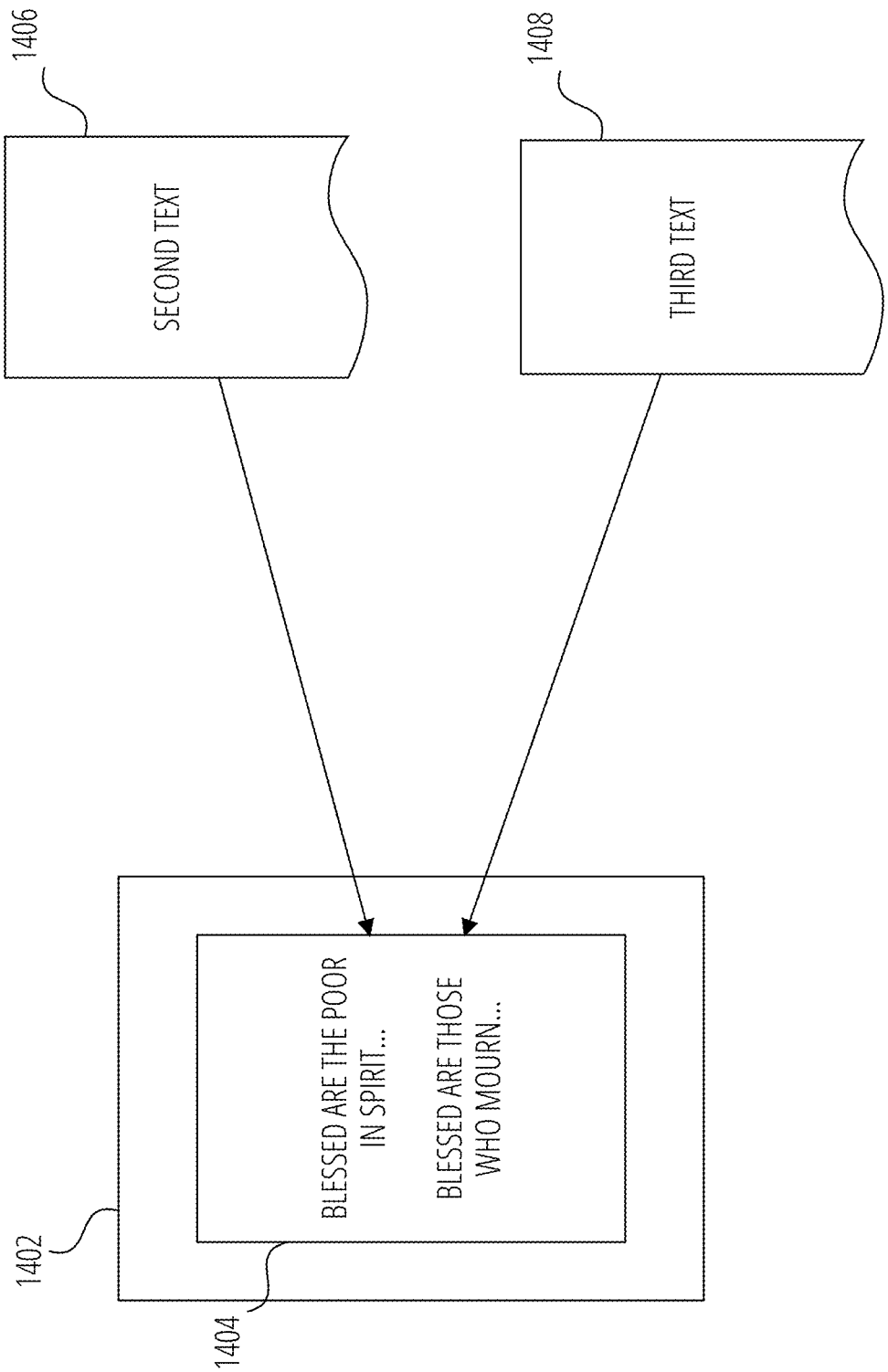
FIG. 14 illustrates an aspect of the subject matter in accordance with some examples.

FIG. 14 shows an example of linking content. Retrieved content, e.g., second text 1406, may correspond to the primary text 1404 that will be displayed on the GUI. For example, the second text 1406 may be a text of a sermon relating to a biblical passage that forms the primary text 1404. In another example, the second text 1406 may also be an excerpt from a book, an article, or a newspaper. The content linking system 108 recognizes specific words or phrases in the second text 1406 and finds the corresponding word or phrase in an authoritative work or other source of content. For example, if the second text 1406 is a biblical passage, the content linking system 108 recognizes the verses or a citation to a verse (e.g., John 3:16) used in the sermon and pulls up the corresponding biblical passage as primary text 1404, to permit the placement of indicators 1206 on the primary text 1404. The content linking system 108 automatically places indicators 1206 on the primary text 1404 to indicate the availability of secondary content and provide a link to the relevant additional information found in text 1406. The placement of indicators 1206 may then be reviewed by a human curator using the curation interface 216, for example to verify correct placement of indicators 1206 and to check the correctness of the citation or the accuracy of other facts, before the primary text 1404, marked and linked to text 1406, is made available to users as discussed above with reference to FIG. 12.

The retrieved content may include affiliated content 212 in the example form of third text 1408 that is related to the second text 1406, in which the third text 1408 provides more information (e.g., commentary) on the second text 1406. The content linking system 108 is also able to link the third text 1408 to the primary text 1404. For example, the second text 1406 may be the text of the sermon, and the third text 1408 may be the pastor's notes on the sermon. The third text 1408 may highlight or emphasize certain words or phrases in the primary text 1404. For example, the third text 1408 may include a specific word, which the content linking system 108 recognizes in the primary text 1404. For example, the third text 1408 may expand or focus on a word or phrase expressed in the primary text 1404. The content linking system 108 then automatically place indicators 1206 on the primary text 1404 to indicate the availability of and provide a link to the relevant additional information found in third text 1408. The placement of indicators 1206 may be reviewed by a human curator, for example, to verify correct placement of indicators 1206 and to check the correctness of the citation or the accuracy of other facts, before the primary text 1404, marked and linked to second text 1406, is made available to users as discussed above with reference to FIG. 12. The curator may also be able to manually select, highlight, emphasize, and/or link other important information to the text.

Figure 15:
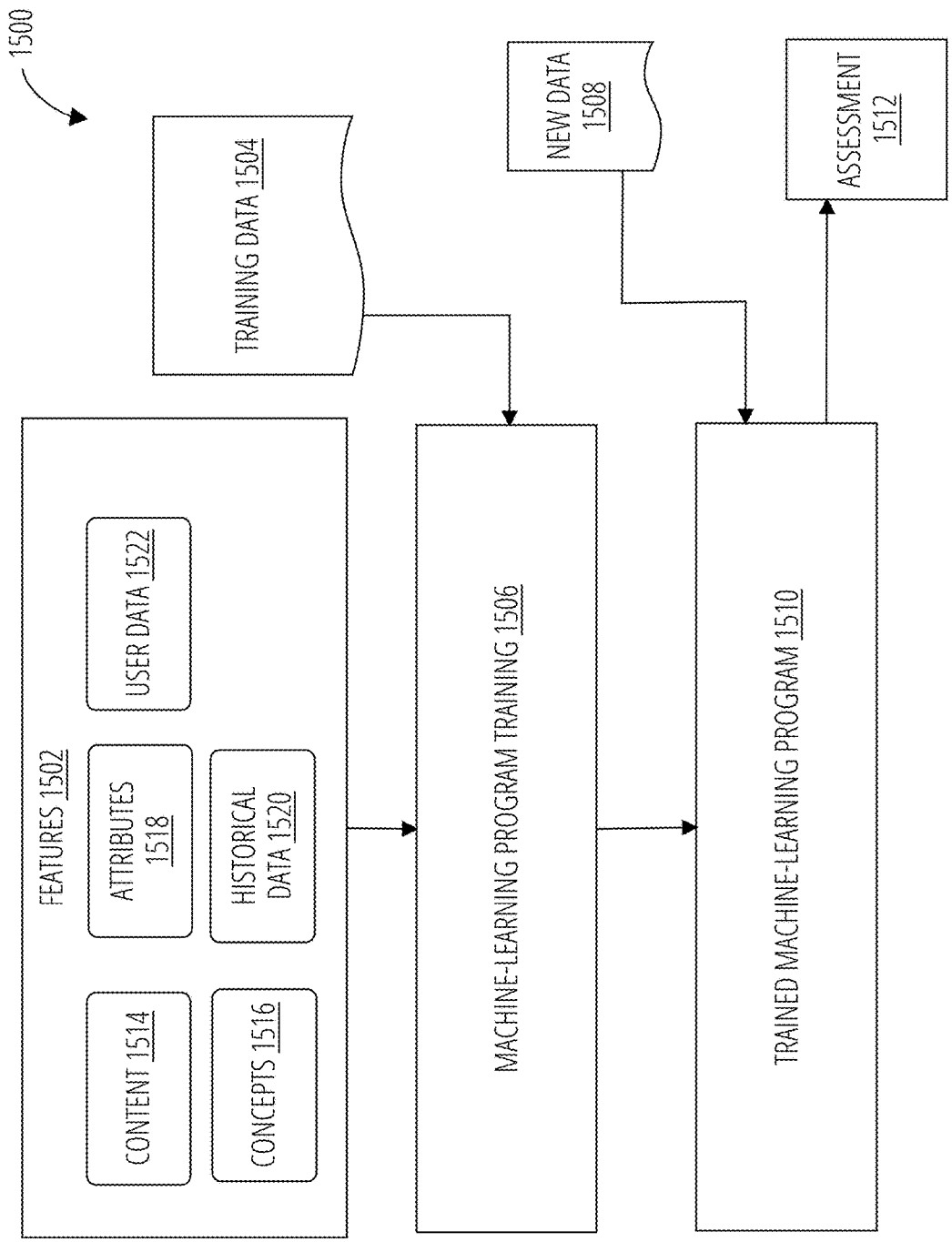
FIG. 15 illustrates training and use of a machine-learning program, according to some example embodiments.

FIG. 15 illustrates training and use of a machine-learning engine 1500, according to some examples, to assist in the content linking operations performed by the content linking system 108. In some examples, machine-learning programs (MLPs), also referred to as machine-learning algorithms or tools, are used to perform operations associated with search, analysis, and metadata generation (e.g., tagging) related to primary content 204, secondary content 208, and affiliated content 212.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 1504 in order to make data-driven predictions or decisions expressed as outputs or assessments (e.g., assessment 1512). Such assessments 1512 are included in the metadata described herein. Although examples are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning algorithms use features 1502 for analyzing the data to generate an assessment 1512. Each of the features 1502 is an individual measurable property of a phenomenon (e.g., extract from the audio or video data) being observed by the analyzer/connector engine 218. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

In some examples, the features 1502 may be of different types and may include one or more of content 1514, concepts 1516, attributes 1518, historical data 1520 and/or user data 1522, merely for example.

The machine-learning algorithms use the training data 1504 (e.g., for a specific speaker) to find correlations among the identified features 1502 that affect the outcome or assessment 1512. In some examples, the training data 1504 includes labeled data related to secondary content 208, which is known data for one or more identified features 1502 and one or more outcomes, such as detecting communication patterns in secondary content 208, detecting the meaning of a message, generating a summary of secondary content 208e, detecting action items in secondary content 208, detecting urgency in the message, detecting a relationship of the user to an audience, calculating score attributes, calculating message scores, etc.

With the training data 1504 and the identified features 1502, the machine-learning engine 1500 is trained at machine-learning program training 1506. The machine-learning engine 1500 appraises the value of the features 1502 as they correlate to the training data 1504. The result of the training is the trained machine-learning program 1510, for a specific content generator or group of content generators for content stored in the external video data source 202, the external text data source 206, or the external audio data source 210, for example.

When the trained machine-learning program 1510 is used to perform an assessment and to generate metadata, new data 1508 (e.g., fresh second content) is provided as an input to the trained machine-learning program 1510, and the trained machine-learning program 1510 generates the assessment 1512 (e.g., additional metadata) as output.

Machine Architecture

Figure 16:
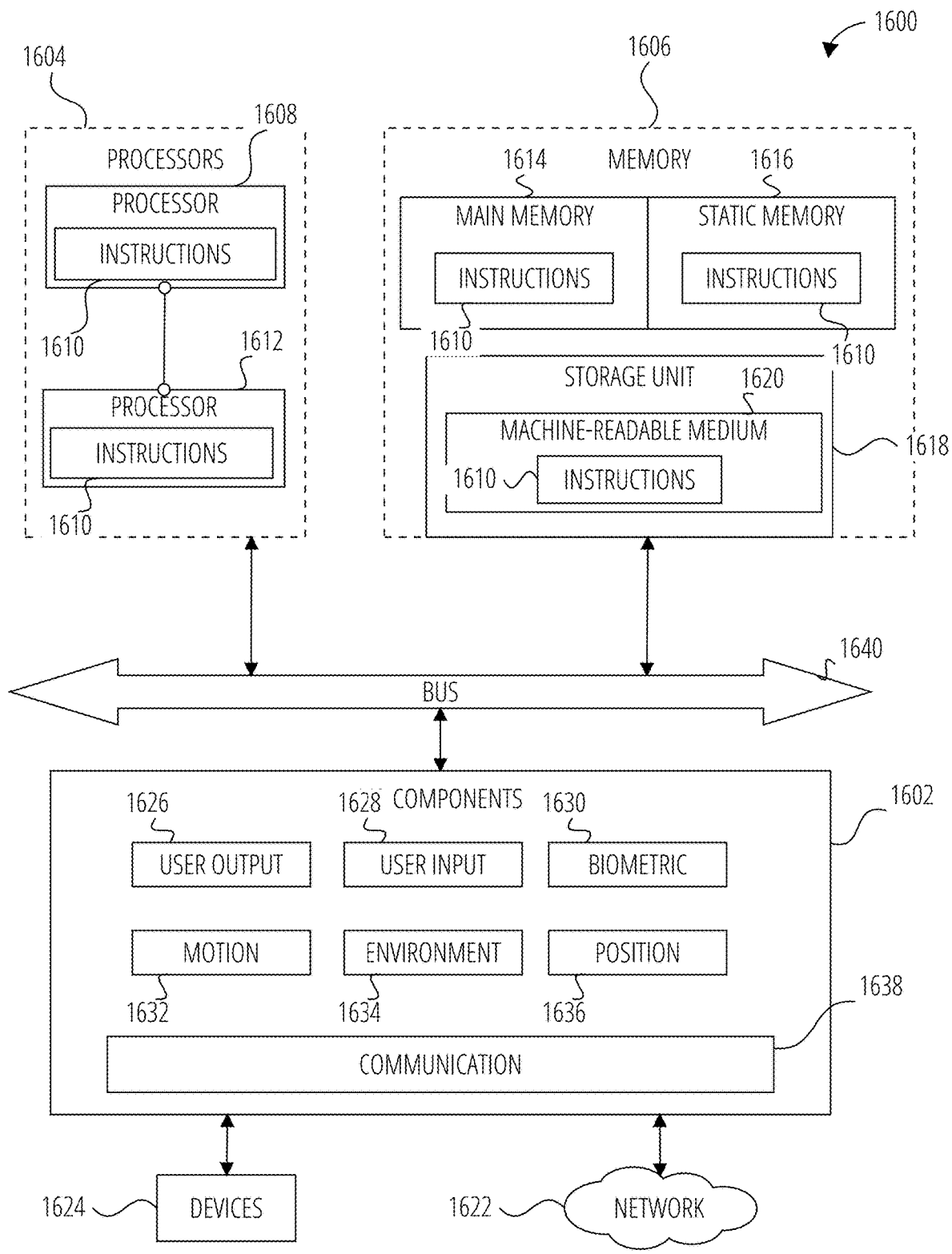
FIG. 16 is a diagrammatic representation of a machine in the form of a computer system within which a set of instructions may be executed for causing the machine to perform any one or more of the methodologies discussed herein, in accordance with some examples.

FIG. 16 is a diagrammatic representation of the machine 1600 within which instructions 1610 (e.g., software, a program, an application, an applet, an app, or other executable code) for causing the machine 1600 to perform any one or more of the methodologies discussed herein may be executed. For example, the instructions 1610 may cause the machine 1600 to execute any one or more of the methods described herein. The instructions 1610 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment content system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1610, sequentially or otherwise, that specify actions to be taken by the machine 1600. Further, while a single machine 1600 is illustrated, the term "machine" shall also be taken to include a collection of machines that individually or jointly execute the instructions 1610 to perform any one or more of the methodologies discussed herein. The machine 1600, for example, may comprise the client device 102 or any one of multiple server devices forming part of the content server system 110. In some examples, the machine 1600 may also comprise both client and server systems, with certain operations of a particular method or algorithm being performed on the server-side and with certain operations of the particular method or algorithm being performed on the client-side.

The machine 1600 may include processors 1604, memory 1606, and input/output I/O components 1602, which may be configured to communicate with each other via a bus 1640. In an example, the processors 1604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1608 and a processor 1612 that execute the instructions 1610. The term "processor" is intended to include multi-core processors that may comprise two or more independent processors (sometimes referred to as "cores") that may execute instructions contemporaneously. Although FIG. 16 shows multiple processors 1604, the machine 1600 may include a single processor with a single-core, a single processor with multiple cores (e.g., a multi-core processor), multiple processors with a single core, multiple processors with multiples cores, or any combination thereof.

The memory 1606 includes a main memory 1614, a static memory 1616, and a storage unit 1618, both accessible to the processors 1604 via the bus 1640. The main memory 1606, the static memory 1616, and storage unit 1618 store the instructions 1610 embodying any one or more of the methodologies or functions described herein. The instructions 1610 may also reside, completely or partially, within the main memory 1614, within the static memory 1616, within machine-readable medium 1620 within the storage unit 1618, within at least one of the processors 1604 (e.g., within the Processor's cache memory), or any suitable combination thereof, during execution thereof by the machine 1600.

The I/O components 1602 may include a wide variety of components to receive input, provide output, produce output, transmit information, exchange information, capture measurements, and so on. The specific I/O components 1602 that are included in a particular machine will depend on the type of machine. For example, portable machines such as mobile phones may include a touch input device or other such input mechanisms, while a headless server machine will likely not include such a touch input device. It will be appreciated that the I/O components 1602 may include many other components that are not shown in FIG. 16. In various examples, the I/O components 1602 may include user output components 1626 and user input components 1628. The user output components 1626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1602 may include biometric components 1630, motion components 1632, environmental components 1634, or position components 1636, among a wide array of other components. For example, the biometric components 1630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1632 include acceleration sensor components (e.g., accelerometer), gravitation sensor components, rotation sensor components (e.g., gyroscope).

The environmental components 1634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos.

Further, the camera system of the client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1602 further include communication components 1638 operable to couple the machine 1600 to a network 1622 or devices 1624 via respective coupling or connections. For example, the communication components 1638 may include a network interface Component or another suitable device to interface with the network 1622. In further examples, the communication components 1638 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1624 may be another machine or any of a wide variety of peripheral devices (e.g., a peripheral device coupled via a USB).

Moreover, the communication components 1638 may detect identifiers or include components operable to detect identifiers. For example, the communication components 1638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1638, such as location via Internet Protocol (IP) geolocation, location via Wi-Fi® signal triangulation, location via detecting an NFC beacon signal that may indicate a particular location, and so forth.

The various memories (e.g., main memory 1614, static memory 1616, and memory of the processors 1604) and storage unit 1618 may store one or more sets of instructions and data structures (e.g., software) embodying or used by any one or more of the methodologies or functions described herein. These instructions (e.g., the instructions 1610), when executed by processors 1604, cause various operations to implement the disclosed examples.

The instructions 1610 may be transmitted or received over the network 1622, using a transmission medium, via a network interface device (e.g., a network interface component included in the communication components 1638) and using any one of several well-known transfer protocols (e.g., hypertext transfer protocol (HTTP)). Similarly, the instructions 1610 may be transmitted or received using a transmission medium via a coupling (e.g., a peer-to-peer coupling) to the devices 1624.

Software Architecture

Figure 17:
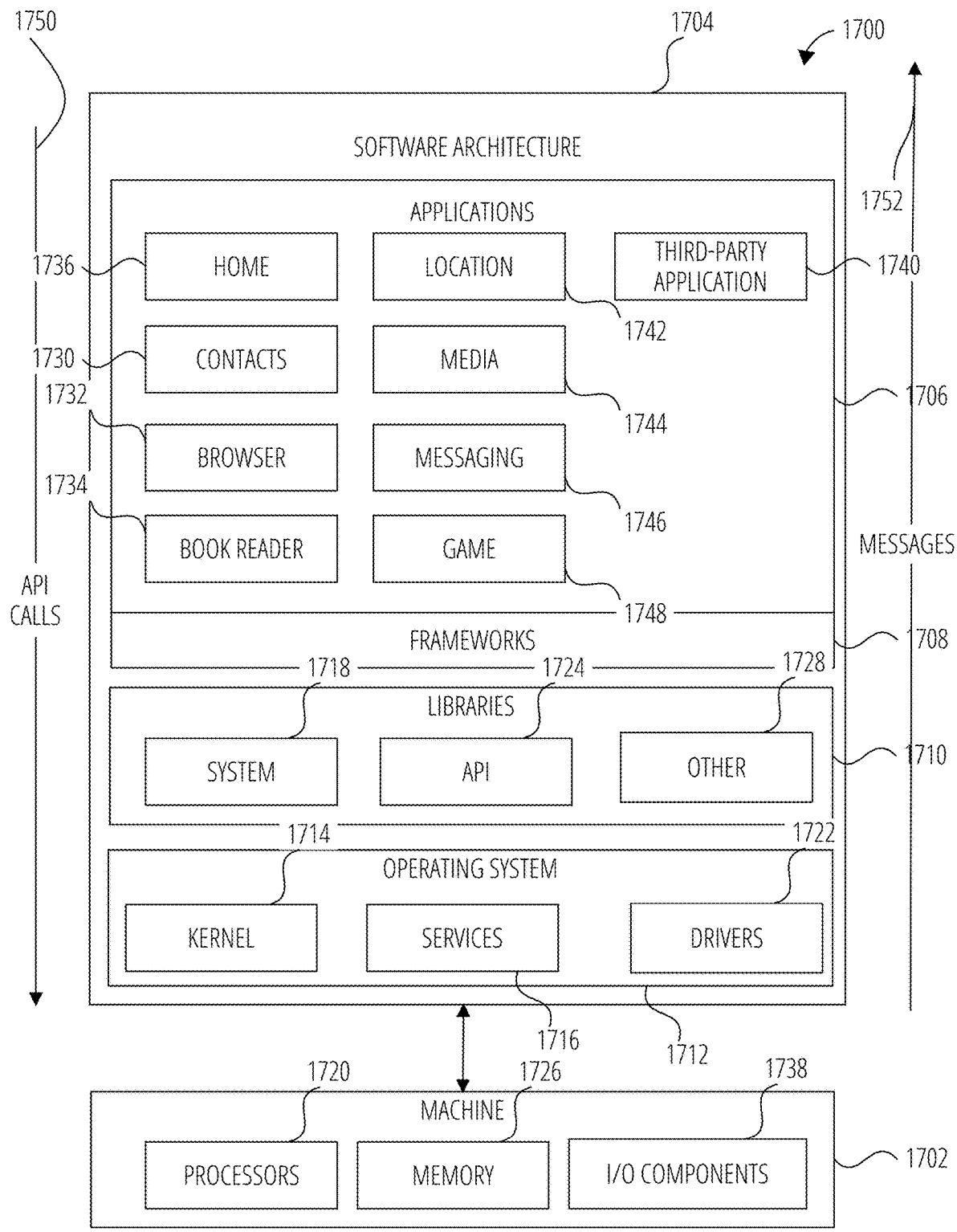
FIG. 17 is a block diagram showing a software architecture within which examples may be implemented.

FIG. 17 is a block diagram 1700 illustrating a software architecture 1704, which can be installed on any one or more of the devices described herein. The software architecture 1704 is supported by hardware such as a machine 1702 that includes processors 1720, memory 1726, and I/O components 1738. In this example, the software architecture 1704 can be conceptualized as a stack of layers, where each layer provides a particular functionality. The software architecture 1704 includes layers such as an operating system 1712, libraries 1710, frameworks 1708, and applications 1706. Operationally, the applications 1706 invoke API calls 1750 through the software stack and receive messages 1752 in response to the API calls 1750.

The operating system 1712 manages hardware resources and provides common services. The operating system 1712 includes, for example, a kernel 1714, services 1716, and drivers 1722. The kernel 1714 acts as an abstraction layer between the hardware and the other software layers. For example, the kernel 1714 provides memory management, processor management (e.g., scheduling), component management, networking, and security settings, among other functionality. The services 1716 can provide other common services for the other software layers. The drivers 1722 are responsible for controlling or interfacing with the underlying hardware. For instance, the drivers 1722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1710 provide a common low-level infrastructure used by the applications 1706. The libraries 1710 can include system libraries 1718 (e.g., C standard library) that provide functions such as memory allocation functions, string manipulation functions, mathematic functions, and the like. In addition, the libraries 1710 can include API libraries 1724 such as content libraries (e.g., libraries to support presentation and manipulation of various content formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1710 can also include a wide variety of other libraries 1728 to provide many other APIs to the applications 1706.

The frameworks 1708 provide a common high-level infrastructure that is used by the applications 1706. For example, the frameworks 1708 provide various graphical user interface (GUI) functions, high-level resource management, and high-level location services. The frameworks 1708 can provide a broad spectrum of other APIs that can be used by the applications 1706, some of which may be specific to a particular operating system or platform.

In an example, the applications 1706 may include a home application 1736, a contacts application 1730, a browser application 1732, a book reader application 1734, a location application 1742, a media application 1744, a messaging application 1746, a game application 1748, and a broad assortment of other applications such as a third-party application 1740. The applications 1706 are programs that execute functions defined in the programs. Various programming languages can be employed to create one or more of the applications 1706, structured in a variety of manners, such as object-oriented programming languages (e.g., Objective-C, Java, or C++) or procedural programming languages (e.g., C or assembly language). In a specific example, the third-party application 1740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1740 can invoke the API calls 1750 provided by the operating system 1712 to facilitate functionality described herein.

CONCLUSION

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A method comprising: causing presentation of a graphical user interface (GUI) on a display screen, the GUI depicting primary content; causing presentation of an indicator corresponding to a portion of the primary content, the indicator indicating availability of secondary content related to the portion of the primary content; detecting user selection of the indicator; responsive to the detection of the user selection of the indicator, causing presentation of an index of secondary content associated with the portion of the primary content, the index of secondary content comprising a plurality of secondary content identifiers that are user selectable; detecting user selection of a selected secondary content identifier from the index of content; responsive to the detection of the user selection of the selected secondary content identifier, retrieving selected secondary content associated with the selected secondary content identifier; and causing presentation of the selected secondary content within the graphical user interface.

The method, wherein the presenting of the index of secondary content further comprises providing the user with a second index of attributes, the second index corresponding to attributes of the secondary content that are user selectable to filter the plurality of secondary content identifiers of the index of secondary content.

The method, wherein the attributes comprise at least one of a person or a group.

The method, wherein the attributes comprise a medium of content.

The method, wherein the presenting of the selected secondary content further comprises overlaying the selected secondary content over the portion of the primary content, so that the user is operationally able to view both the selected secondary content and the primary content, simultaneously.

The method, wherein the presenting of the indicator further comprises presenting the indicator adjacent to the portion of the primary content.

The method, wherein the presenting of the index of secondary content comprises causing display of the index of secondary content adjacent to the portion of the primary content.

The method, wherein the presenting of the secondary content further comprises presenting a link to affiliated content related to the portion of the primary content, the link being user-selectable to be directed the user to a source of the affiliated content.

The method, wherein the plurality of secondary content identifiers identify respective sources of secondary content.

The method, comprising: identifying a plurality of sources of secondary content related to the primary content; accessing a first source of the secondary content, from the plurality of sources of secondary content; accessing the secondary content from the first source; automatically analyzing the secondary content to generate metadata related to the secondary content; and using the metadata, automatically associating the secondary content with the portion of the primary content, the presentation of the index of secondary content associated with the portion of the primary content being based on the association of the secondary content with the portion of the primary content.

The method, wherein the identifying of the plurality of sources of secondary content comprises receiving identification of a source of secondary content from a user, and the automatic association of the secondary content with the portion of the primary content comprises identifying a portion of the secondary content associated with the portion of the primary content using the metadata, and, responsive to the identification of the portion of the secondary content, automatically associating the portion of the secondary content with the portion of the primary content.

The method, wherein the secondary content comprises audio data and the analyzing of the secondary content comprises identifying speaker audio data within the audio data, and analyzing the speaker audio data in order to generate the metadata.

The method, wherein the analyzing of the speaker audio data comprises automatically generating a textual transcription of the speaker audio data.

The method, wherein the analyzing of the speaker audio data comprises automatically detecting changes in at least one of tone or cadence in the speaker audio data, and generating the metadata based on the changes.

The method, wherein the secondary content comprises audio data, and the analyzing of the secondary content comprises identifying audience audio data within the audio data, and analyzing the audience audio data in order to generate the metadata.

The method, wherein the secondary content comprises video data, and the analyzing of the secondary content comprises analyzing image data of a speaker represented in the video data in order to generate the metadata.

The method, wherein the analyzing of the image data of the speaker comprises identifying at least one of a predetermined movement of the speaker or a predetermined facial expression of the speaker.

The method, further comprising, using the metadata, automatically identifying, and tagging portions of the secondary content.

The method, further comprising, using the metadata, automatically editing the secondary content based on the identification of a plurality of portions of the secondary content.

A non-transitory computer-readable storage medium, the computer-readable storage medium including instructions that when executed by a computer, cause the computer to: cause presentation of a graphical user interface (GUI) on a display screen, the GUI depicting primary content; cause presentation of an indicator corresponding to a portion of the primary content, the indicator indicating availability of secondary content related to the portion of the primary content; detect user selection of the indicator; responsive to the detection of the user selection of the indicator, cause presentation of an index of secondary content associated with the portion of the primary content, the index of secondary content comprising a plurality of secondary content identifiers that are user selectable; detect user selection of a selected secondary content identifier from the index of content; responsive to the detection of the user selection of the selected secondary content identifier, retrieve selected secondary content associated with the selected secondary content identifier; and cause presentation of the selected secondary content within the graphical user interface.

The computer-readable storage medium, wherein the presenting of the index of secondary content further comprises provide the user with a second index of attributes, the second index corresponding to attributes of the secondary content that are user selectable to filter the plurality of secondary content identifiers of the index of secondary content.

The computer-readable storage medium, wherein the attributes comprise at least one of a person or a group.

The computer-readable storage medium wherein the attributes comprise a medium of content.

The computer-readable storage medium, wherein the presenting of the selected secondary content further comprises overlay the selected secondary content over the portion of the primary content, so that the user is operationally able to view both the selected secondary content and the primary content, simultaneously.

The computer-readable storage medium, wherein the presentation of the indicator further comprises presenting the indicator adjacent to the portion of the primary content.

The computer-readable storage medium, wherein the presenting of the index of secondary content comprises cause display of the index of secondary content adjacent to the portion of the primary content.

The computer-readable storage medium, wherein the presentation of the secondary content further comprises presenting a link to affiliated content related to the portion of the primary content, the link being user-selectable to be directed the user to a source of the affiliated content.

The computer-readable storage medium, wherein the plurality of secondary content identifiers identify respective sources of secondary content.

The computer-readable storage medium, comprising: identify a plurality of sources of secondary content related to the primary content; access a first source of the secondary content, from the plurality of sources of secondary content; access the secondary content from the first source; automatically analyze the secondary content to generate metadata related to the secondary content; and using the metadata, automatically associate the secondary content with the portion of the primary content, the presentation of the index of secondary content associated with the portion of the primary content being based on the association of the secondary content with the portion of the primary content.

The computer-readable storage medium, wherein the identifying of the plurality of sources of secondary content comprises receive identification of a source of secondary content from a user, and the automatic association of the secondary content with the portion of the primary content comprises identifying a portion of the secondary content associated with the portion of the primary content using the metadata, and, responsive to the identification of the portion of the secondary content, automatically associating the portion of the secondary content with the portion of the primary content.

The computer-readable storage medium, wherein the secondary content comprises audio data and the analyzing of the secondary content comprises identify speaker audio data within the audio data, and analyzing the speaker audio data in order to generate the metadata.

The computer-readable storage medium, wherein the analyzing of the speaker audio data comprises automatically generate a textual transcription of the speaker audio data.

The computer-readable storage medium, wherein the analyzing of the speaker audio data comprises automatically detect changes in at least one of tone or cadence in the speaker audio data, and generating the metadata based on the changes.

The computer-readable storage medium, wherein the secondary content comprises audio data, and the analyzing of the secondary content comprises identifying audience audio data within the audio data, and analyzing the audience audio data in order to generate the metadata.

The computer-readable storage medium, wherein the secondary content comprises video data, and the analysis of the secondary content comprises analyzing image data of a speaker represented in the video data in order to generate the metadata.

The computer-readable storage medium, wherein the analyzing of the image data of the speaker comprises identify at least one of a predetermined movement of the speaker or a predetermined facial expression of the speaker.

The computer-readable storage medium, wherein the instructions further configure the computer to, using the metadata, automatically identify and tagging portions of the secondary content.

The computer-readable storage medium, wherein the instructions further configure the computer to, using the metadata, automatically edit the secondary content based on the identification of a plurality of portions of the secondary content.

A computing apparatus comprising: a processor; and a memory storing instructions that, when executed by the processor, configure the apparatus to: cause presentation of a graphical user interface (GUI) on a display screen, the GUI depicting primary content; cause presentation of an indicator corresponding to a portion of the primary content, the indicator indicating availability of secondary content related to the portion of the primary content; detect user selection of the indicator; responsive to the detection of the user selection of the indicator, cause presentation of an index of secondary content associated with the portion of the primary content, the index of secondary content comprising a plurality of secondary content identifiers that are user selectable; detect user selection of a selected secondary content identifier from the index of content; responsive to the detection of the user selection of the selected secondary content identifier, retrieve selected secondary content associated with the selected secondary content identifier; and cause presentation of the selected secondary content within the graphical user interface.

The computing apparatus, wherein the presenting of the index of secondary content further comprises provide the user with a second index of attributes, the second index corresponding to attributes of the secondary content that are user selectable to filter the plurality of secondary content identifiers of the index of secondary content.

The computing apparatus, wherein the attributes comprise at least one of a person or a group.

The computing apparatus, wherein the attributes comprise a medium of content.

The computing apparatus, wherein the presenting of the selected secondary content further comprises overlay the selected secondary content over the portion of the primary content, so that the user is operationally able to view both the selected secondary content and the primary content, simultaneously.

The computing apparatus, wherein the presentation of the indicator further comprises presenting the indicator adjacent to the portion of the primary content.

The computing apparatus, wherein the presenting of the index of secondary content comprises cause display of the index of secondary content adjacent to the portion of the primary content.

The computing apparatus, wherein the presentation of the secondary content further comprises presenting a link to affiliated content related to the portion of the primary content, the link being user-selectable to be directed the user to a source of the affiliated content.

The computing apparatus, wherein the plurality of secondary content identifiers identify respective sources of secondary content.

The computing apparatus, comprising: identify a plurality of sources of secondary content related to the primary content; access a first source of the secondary content, from the plurality of sources of secondary content; access the secondary content from the first source; automatically analyze the secondary content to generate metadata related to the secondary content; and using the metadata, automatically associate the secondary content with the portion of the primary content, the presentation of the index of secondary content associated with the portion of the primary content being based on the association of the secondary content with the portion of the primary content.

The computing apparatus, wherein the identifying of the plurality of sources of secondary content comprises receive identification of a source of secondary content from a user, and the automatic association of the secondary content with the portion of the primary content comprises identifying a portion of the secondary content associated with the portion of the primary content using the metadata, and, responsive to the identification of the portion of the secondary content, automatically associating the portion of the secondary content with the portion of the primary content.

The computing apparatus, wherein the secondary content comprises audio data and the analyzing of the secondary content comprises identifying speaker audio data within the audio data, and analyzing the speaker audio data in order to generate the metadata.

The computing apparatus, wherein the analyzing of the speaker audio data comprises automatically generating a textual transcription of the speaker audio data.

The computing apparatus, wherein the analyzing of the speaker audio data comprises automatically detect changes in at least one of tone or cadence in the speaker audio data, and generating the metadata based on the changes.

The computing apparatus, wherein the secondary content comprises audio data, and the analyzing of the secondary content comprises identifying audience audio data within the audio data, and analyzing the audience audio data in order to generate the metadata.

The computing apparatus, wherein the secondary content comprises video data, and the analysis of the secondary content comprises analyzing image data of a speaker represented in the video data in order to generate the metadata.

The computing apparatus, wherein the analyzing of the image data of the speaker comprises identify at least one of a predetermined movement of the speaker or a predetermined facial expression of the speaker.

The computing apparatus, wherein the instructions further configure the apparatus to, using the metadata, automatically identify and tagging portions of the secondary content.

The computing, wherein the instructions further configure the apparatus to, using the metadata, automatically edit the secondary content based on the identification of a plurality of portions of the secondary content.

LISTING OF DRAWING ELEMENTS 100 content system
102 client device
104 content client
106 application
108 content linking system
110 content server system
112 third-party systems
114 network
116 Application Program Interface (API) server
118 database server
120 database
122 web server
124 client device
126 content client
128 application
130 interactions
202 external video data source
204 primary content
206 external text data source
208 secondary content
210 external audio data source
212 affiliated content
214 access interface
216 curation interface
218 analyzer/connector engine
220 media processing engine
222 link data
302 audio analyzer
304 video analyzer
306 tone 308 frequency
310 reaction
312 motion
314 expression
316 transcription
318 geographic correlation detector
320 prediction engine
402 keyword file
404 metadata output file
406 transcript
408 video content
410 metadata generation file
412 keyword file location
414 content source location
416 metadata output location
502 metadata output file
504 filter attributes
506 pastor
508 book of bible
510 chapter
512 verse
514 video content
602 primary content table
604 primary content—portion table
606 secondary content table
608 secondary content—portions table
610 user table
612 topics table
614 affiliated content table
616 affiliated content—portions table
702 primary content portion
704 primary content portion
706 secondary content portion
708 secondary content portion
710 affiliated content portion
712 affiliated content portion
800 method
802 block
804 block
806 block
808 block
810 block
812 block
814 block
902 block
904 block
906 block
908 block
910 block
912 block
914 block
916 block
918 AI prediction process
1000 method
1002 block
1004 block
1006 block
1008 block
1010 block
1012 block
1014 block
1016 block
1018 block
1102 block
1104 block
1106 block
1108 block
1110 done block
1112 method
1202 graphical user interface
1204 body of text
1206 indicator
1208 index of content
1210 supplemental content
1212 secondary content identifier
1302 filtering graphical user interface
1304 search box
1306 drop-down list
1308 filter attributes
1402 graphical user element
1404 primary text
1406 second text
1408 third text
1500 machine-learning engine
1502 features
1504 training data
1506 machine-learning program training
1508 new data
1510 trained machine-learning program
1512 assessment
1514 content
1516 concepts
1518 attributes
1520 historical data
1522 user data
1600 machine
1602 I/O components
1604 processors
1606 memory
1608 processor
1610 instructions
1612 processor
1614 main memory
1616 static memory
1618 storage unit
1620 machine-readable medium
1622 network
1624 devices
1626 user output components
1628 user input components
1630 biometric components
1632 motion components
1634 environmental components
1636 position components
1638 communication components
1640 bus
1700 block diagram
1702 machine
1704 software architecture
1706 applications
1708 frameworks
1710 libraries
1712 operating system
1714 kernel
1716 services
1718 system libraries
1720 processors
1722 drivers
1724 API libraries
1726 memory
1728 other libraries
1730 contacts application
1732 browser application
1734 book reader application 1736 home application
1738 I/O components
1740 third-party application
1742 location application
1744 media application
1746 messaging application
1748 game application
1750 API calls
1752 messages

What is claimed is:

1. A method comprising:
causing presentation of a graphical user interface (GUI) on a display screen, the GUI depicting primary content;
causing presentation within the GUI of an indicator corresponding to a portion of the primary content, the indicator indicating availability of secondary content, related to the portion of the primary content;
detecting user selection of the indicator;
responsive to the detection of the user selection of the indicator, causing presentation within the GUI of a plurality of secondary content identifiers that are user selectable to access selected secondary content associated with the portion of the primary content;
causing presenting a plurality of content creator identifiers, each content creator identifier of the plurality of content creator identifiers being user selectable to filter the plurality of secondary content identifiers;
detecting user selection of a selected content creator identifier from the plurality of content creator identifiers;
responsive to the detection of the user selection of the selected content creator identifier, filtering the plurality of secondary content identifiers to generate a filtered subset of secondary content identifiers;
detecting user selection of a selected secondary content identifier, associated with selected secondary content, from the filtered subset of secondary content identifiers
responsive to the detection of the user selection of the selected secondary content identifier, retrieving the selected secondary content from a secondary source associated with the selected secondary content identifier; and
causing presentation of the selected secondary content within the GUI.

2. The method of claim 1, wherein the presenting of the selected secondary content further comprises overlaying the selected secondary content over the portion of the primary content, so that the user is operationally able to view both the selected secondary content and the primary content, simultaneously.

3. The method of claim 1, wherein the presenting of the indicator further comprises presenting the indicator adjacent to the portion of the primary content.

4. The method of claim 1, wherein the presenting of the plurality of secondary content identifiers comprises causing display of the plurality of secondary content identifiers adjacent to the portion of the primary content.

5. The method of claim 1, wherein the presenting of the secondary content further comprises presenting a link to affiliated content related to the portion of the primary content, the link being user-selectable to be directed the user to a source of the affiliated content.

6. The method of claim 1, comprising:
identifying a plurality of sources of secondary content related to the primary content;
accessing a first source of the secondary content, from the plurality of sources of secondary content;
accessing the secondary content from the first source;
automatically analyzing the secondary content to generate metadata related to the secondary content; and
using the metadata, automatically associating the secondary content with the portion of the primary content, the presentation of the plurality of secondary content identifiers being based on the association of the secondary content with the portion of the primary content.

7. The method of claim 6, wherein the identifying of the plurality of sources of secondary content comprises receiving identification of a source of secondary content from a user, and the automatic association of the secondary content with the portion of the primary content comprises identifying a portion of the secondary content associated with the portion of the primary content using the metadata, and, responsive to the identification of the portion of the secondary content, automatically associating the portion of the secondary content with the portion of the primary content.

8. The method of claim 6, wherein the secondary content comprises audio data and the analyzing of the secondary content comprises identifying speaker audio data within the audio data, and analyzing the speaker audio data in order to generate the metadata.

9. The method of claim 8, wherein the analyzing of the speaker audio data comprises automatically generating a textual transcription of the speaker audio data.

10. The method of claim 8, wherein the analyzing of the speaker audio data comprises automatically detecting changes in at least one of tone or cadence of the speaker audio data, and generating the metadata based on the changes.

11. The method of claim 6, wherein the secondary content comprises audio data, and the analyzing of the secondary content comprises identifying audience audio data within the audio data, and analyzing the audience audio data in order to generate the metadata.

12. The method of claim 6, wherein the secondary content comprises video data, and the analyzing of the secondary content comprises analyzing image data of a speaker represented in the video data in order to generate the metadata.

13. The method of claim 12, wherein the analyzing of the image data of the speaker comprises identifying at least one of a predetermined movement of the speaker or a predetermined facial expression of the speaker.

14. The method of claim 6, further comprising, using the metadata, automatically identifying, and tagging portions of the secondary content.

15. The method of claim 6, further comprising, using the metadata, automatically editing the secondary content based on the identification of a plurality of portions of the secondary content.

16. A computing apparatus comprising:
a processor; and
a memory storing instructions that, when executed by the processor, configure the apparatus to:
cause presentation of a graphical user interface (GUI) on a display screen, the GUI depicting primary content;
cause presentation within the GUI of an indicator corresponding to a portion of the primary content, the indicator indicating availability of secondary content related to the portion of the primary content;
detect user selection of the indicator;
responsive to the detection of the user selection of the indicator, cause presentation within the GUI of a plurality of secondary content source identifiers that are user selectable to access selected secondary content associated with the portion of the primary content;

cause presenting a plurality of content creator identifiers, each content creator identifier of the plurality of content creator identifiers being user selectable to filter the plurality of secondary content identifiers;

detect user selection of a selected content creator identifier from the plurality of content creator identifiers;

responsive to the detection of the user selection of the selected content creator identifier, filter the plurality of secondary content identifiers to generate a filtered subset of secondary content identifiers;

detect user selection of a selected secondary content identifier, associated with selected secondary content, from the filtered subset of secondary content identifiers responsive to the detection of the user selection of the selected secondary content source identifier, retrieve the selected secondary content from a secondary source associated with the selected secondary content identifier; and cause presentation of the selected secondary content within the GUI.

* * * * *